(12) United States Patent
Takai et al.

(10) Patent No.: US 10,332,091 B2
(45) Date of Patent: Jun. 25, 2019

(54) TAX-EXEMPT SALE DOCUMENT CREATING SYSTEM, TAX-EXEMPT SALE DOCUMENT CREATING APPARATUS, AND TAX EXEMPT SALE DOCUMENT CREATING METHOD

(71) Applicants: Toshiki Takai, Tokyo (JP); Toshinori Takaki, Tokyo (JP)

(72) Inventors: Toshiki Takai, Tokyo (JP); Toshinori Takaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 468 days.

(21) Appl. No.: 15/162,794

(22) Filed: May 24, 2016

(65) Prior Publication Data
US 2016/0350737 A1  Dec. 1, 2016

(30) Foreign Application Priority Data

May 25, 2015  (JP) .................................. 2015-105203
Nov. 10, 2015  (JP) .................................. 2015-220712

(51) Int. Cl.
*G06K 9/00* (2006.01)
*G06Q 20/20* (2012.01)
(Continued)

(52) U.S. Cl.
CPC ......... *G06Q 20/207* (2013.01); *G06Q 20/209* (2013.01); *G06Q 20/389* (2013.01);
(Continued)

(58) Field of Classification Search
CPC .. G06Q 20/207; G06Q 40/123; G06Q 20/209; G06Q 20/389; G06Q 20/405;
(Continued)

(56) References Cited

U.S. PATENT DOCUMENTS 7,149,347 B1 * 12/2006 Wnek ................ G06K 9/00469
382/159
2002/0163653 A1  11/2002 Struble et al.
(Continued)

FOREIGN PATENT DOCUMENTS

JP  2002-279146  9/2002
JP  2014-032441  2/2014
(Continued)

OTHER PUBLICATIONS

Office Action dated Apr. 20, 2018 issued to related U.S. Appl. No. 15/343,392.
(Continued)

*Primary Examiner* — A. Hunter Wilder
*Assistant Examiner* — Joseph M Mutshcler
(74) *Attorney, Agent, or Firm* — IPUSA, PLLC

(57) ABSTRACT

A tax-exempt sale document creating system including a recognition unit configured to recognize, based on an obtained image, a described content of a passport or a qualification document that indicates a qualification for entering a country; an information obtaining unit configured to obtain price information on a selling price of a commodity; a printing unit configured to print a tax document for a tax-exempt sale for the commodity using the described content recognized by the recognition unit; and a determination unit configured to determine, based on the price information obtained by the information obtaining unit, whether an image of the passport or the qualification document in the obtained image should be printed with the tax document for the tax-exempt sale.

20 Claims, 27 Drawing Sheets

(51) Int. Cl.
*G06Q 20/38* (2012.01)
*G06Q 20/40* (2012.01)
*G06Q 30/02* (2012.01)
*G06Q 40/00* (2012.01)
*G06Q 50/26* (2012.01)

(52) U.S. Cl.
CPC ....... *G06Q 20/405* (2013.01); *G06Q 30/0283* (2013.01); *G06Q 40/123* (2013.12); *G06Q 50/265* (2013.01); *G06K 9/00442* (2013.01); *G06K 2209/01* (2013.01)

(58) Field of Classification Search
CPC ............. G06Q 30/0283; G06Q 50/265; G06K 9/00442; G06K 2209/01
USPC .......................................................... 705/19
See application file for complete search history.

(56) References Cited

U.S. PATENT DOCUMENTS

| | | |
|---|---|---|
| 2003/0236755 A1 | 12/2003 | Dagelet, Jr. |
| 2005/0021410 A1 | 1/2005 | Ostlund |
| 2006/0167705 A1 | 7/2006 | Ostlund |
| 2010/0153545 A1 | 6/2010 | Mizuno |
| 2010/0207741 A1 | 8/2010 | Gudmundson et al. |
| 2011/0229864 A1 | 9/2011 | Short et al. |
| 2013/0014008 A1 | 1/2013 | Damera-Venkata |
| 2013/0230205 A1 | 9/2013 | Nuggehalli |
| 2015/0007024 A1 | 1/2015 | Jeong et al. |
| 2015/0088776 A1 | 3/2015 | Parrish et al. |
| 2015/0193825 A1* | 7/2015 | Song ............. G06Q 30/0257 358/1.18 |
| 2016/0210768 A1 | 7/2016 | Yoo et al. |
| 2016/0350737 A1 | 12/2016 | Takai et al. |
| 2017/0091875 A1 | 3/2017 | Suzuki |
| 2017/0270647 A1 | 9/2017 | Zhou et al. |

FOREIGN PATENT DOCUMENTS

| | | |
|---|---|---|
| JP | 2015-129986 | 7/2015 |
| JP | 5768175 | 8/2015 |
| JP | 2016118966 A * | 6/2016 |

OTHER PUBLICATIONS

Ricoh Company, Ltd., Ricoh Japan develops a system for efficiently creating forms necessary for duty-free sales, [online], Jul. 21, 2015, URL, http://www.ricoh.co.jp/sales/news/2015/pdf/20150721_1.pdf.

Japan Tourism Agency, Ministry of Economy, Trade and Industry, As to a sales system with exemption from consumption tax for foreign tourists and the like, [online], May 27, 2014, pp. 1-40, URL, http://www.kanto.meti.go.jp/seisaku/ryutsu/data/20140527menzei_shiryo1.pdf (With partial English translation).

Japanese Office Action dated Jan. 31, 2017.

* cited by examiner

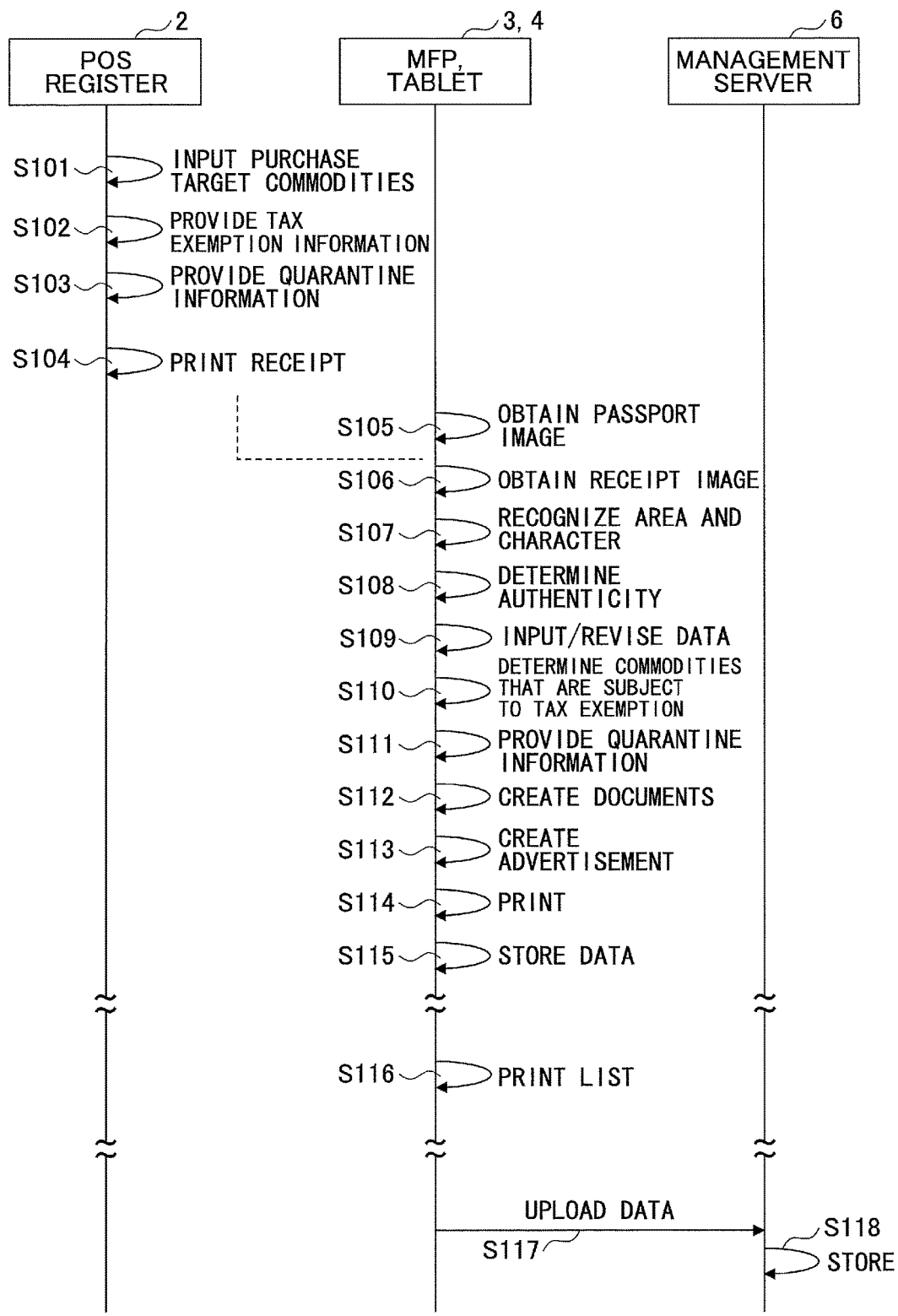

FIG.17

| THE NUMBER OF PRINTING ITEMS | 2 | 3 | 4 | 5 |
|---|---|---|---|---|
| SHEET SIZE | A5 | A4 (OR TWO A5) | A4 | A5+A4 |
| NOTE | DO NOT PRINT ADVERTISEMENT | 4 ITEMS INCLUDING ADVERTISEMENT ITEM | DO NOT PRINT ADVERTISEMENT | 6 ITEMS INCLUDING ADVERTISEMENT ITEM |

FIG.20

輸出免税物品購入記録票
Record of Purchase of Consumption Tax-Exempt for Export

| 所轄税務署/Tax office concerned | 納税地/Place for Tax Payment |
|---|---|
| 販売者氏名・名称/Seller's Name | 販売場所在地/Selling Place |

購入年月日/Date of Purchase
月　　　日　　　年
Month　Date　Year

消耗品/Consumable Commodities

| 品名 Name of Commodity | 単価 Unit Price | 数量 Quantity | 販売価額 Price |
|---|---|---|---|

合計価額/Total amount

一般物品（消耗品を除く）/Commodities except consumables

| 品名 Name of Commodity | 単価 Unit Price | 数量 Quantity | 販売価額 Price |
|---|---|---|---|

合計価額/Total amount

本邦から出国する際又は居住者となる際に、その出港地を所轄する税関長又はその住所若しくは居所を所轄する税務署長に購入記録票を提出しなければならない。

When departing Japan, or if becoming a resident of Japan, you are required to submit your "Record of Purchase Card" to either the Director of Customs that has jurisdiction over your departure location or the head of the tax office that has jurisdiction over your place of residence or address.

從本國出境或成為日本國居民時，必須向當地所屬的海關首長或其住所或住居所所在地所屬的稅務署長提交購買記錄單（購入記錄票）。

일본에서 출국하거나 거주자가 될 때 그 출항지를 관할하는 세관장 또는 그 주소 혹은 거소를 관할하는 세무서장에게 구입기록표를 제출해야 합니다.

| 旅券等の種類/Passport etc. PASSPORT旅券 | 番号/No. |
|---|---|
| 在留資格/Status of Residence | 国籍/Nationality |
| 上陸年月日/Date of Landing | |
| 購入者氏名（活字体）/Name in Full(in block letters) | |
| 生年月日/Date of Birth of Purchaser 月　　日　　年 Month　Date　Year | |

FIG.21

最終的に輸出となる名物品の消費税免税購入についての購入者誓約書
Covenant of Purchaser of Consumption Tax-Exempt of Ultimate Export ・当該消耗品を、購入した日から30日以内に輸出されるものとして購入し、日本で処分しないことを誓約します。
I certify that the goods listed as "consumable commodities" on this card were purchased by me for export from Japan within 30days from the purchase date and will not be disposed of within Japan.

・当該一般物品を、日本から最終的には輸出されるものとして購入し、日本で処分しないことを誓約します。
I certify that the goods listed as "commodities except consumables" on this card were purchased by me for ultimate export from Japan and will not be disposed of within Japan.

署　名
Signature

販売者氏名・名称/Seller's Name

購入年月日/Date of Purchase
月　　　日　　　年
Month　Date　Year

消耗品/Consumable Commodities
品名　　　　　　　単価　　　数量　　　販売価額
Name of Commodity　Unit Price　Quantity　Price 合計価額/Total amount 一般物品(消耗品を除く)/Commodities except consumables
品名　　　　　　　単価　　　数量　　　販売価額
Name of Commodity　Unit Price　Quantity　Price 合計価額/Total amount 旅券等の種類/Passport etc.
PASSPORT旅券

在留資格/Status of Residence

上陸年月日/Date of Landing

購入者氏名(活字体)/Name in Full(in block letters)

生年月日/Date of Birth of Purchaser
月　　　日　　　年
Month　Date　Year

番号/No.

国籍/Nationality

FIG.22

LIST OF CONSUMABLE COMMODITIES

| COMMODITY NAME | QUANTITY |
|---|---|
| ○○○○○ | ○ |
| ○○○○○ | ○ |
| ○○○○○ | ○ |
| ○○○○○ | ○ |

TAX-EXEMPT SALE DOCUMENT CREATING SYSTEM, TAX-EXEMPT SALE DOCUMENT CREATING APPARATUS, AND TAX EXEMPT SALE DOCUMENT CREATING METHOD

BACKGROUND OF THE INVENTION

1. Field of the Invention

The disclosures herein generally relate to a tax-exempt sale document creating system, a tax-exempt sale document creating apparatus, and a tax-exempt sale document creating method.

2. Description of the Related Art

A system for printing documents for tax-exempt sales is known in the related art. Japanese Unexamined Patent Application Publication No. 2014-32441 discloses a system that reads a two-dimensional code displayed on a landing permit attached to a passport and prints a record of purchase of consumption tax-exempt for export and a covenant of a purchaser. It is desired to reduce workloads and/or human errors when the documents for the tax-exempt sales are created.

SUMMARY OF THE INVENTION

It is a general object of at least one embodiment of the present disclosure to provide a tax-exempt sale document creating system, a tax-exempt sale document creating apparatus, and a tax-exempt sale document creating method that substantially obviate one or more problems caused by the limitations and disadvantages of the related art.

An embodiment provides a tax-exempt sale document creating system including a recognition unit configured to recognize, based on an obtained image, a described content of a passport or a qualification document that indicates a qualification for entering a country; an information obtaining unit configured to obtain price information on a selling price of a commodity; a printing unit configured to print a tax document for a tax-exempt sale for the commodity using the described content recognized by the recognition unit; and a determination unit configured to determine, based on the price information obtained by the information obtaining unit, whether an image of the passport or the qualification document in the obtained image should be printed with the tax document for the tax-exempt sale. The printing unit is configured to print the image of the passport or the qualification document with the document of the tax-exempt sale in a case in which the determination unit has determined that the image of the passport or the qualification document should be printed with the tax document for the tax-exempt sale.

An embodiment provides a tax-exempt sale document creating apparatus including a recognition unit configured to recognize, based on an obtained image, a described content of a passport or a qualification document that indicates a qualification for entering a country; an information obtaining unit configured to obtain price information on a selling price of a commodity; a printing unit configured to print a tax document for a tax-exempt sale for the commodity using the described content recognized by the recognition unit; and a determination unit configured to determine, based on the price information obtained by the information obtaining unit, whether an image of the passport or the qualification document in the obtained image should be printed with the tax document for the tax-exempt sale. The printing unit is configured to print the image of the passport or the qualification document with the document of the tax-exempt sale in a case in which the determination unit has determined that the image of the passport or the qualification document should be printed with the tax document for the tax-exempt sale. The printing unit is configured to discard data of the obtained image after the described content of the passport or the qualification document is recognized by the recognition unit in a case in which the determination unit has determined that the image of the passport or the qualification document should not be printed with the tax document for the tax-exempt sale.

BRIEF DESCRIPTION OF THE DRAWINGS

FIG. 9 is a sequence chart illustrating an example of processes executed by the embodiment;

FIG. 17 is an example of a table in which the number of printing items, a size of a sheet, and whether to print the advertisement are associated;

FIG. 20 is a diagram illustrating an example of a record of purchase;

FIG. 21 is a diagram illustrating an example of a covenant of a purchaser;

FIG. 22 is a diagram illustrating an example of a list of consumable commodities;

FIG. 25 is a drawing illustrating examples of the record of purchase and the covenant of the purchaser; and FIG. 26 is a drawing illustrating an example of a note of caution printed on a back surface.

DESCRIPTION OF THE EMBODIMENTS

In the following, embodiments of the present disclosure will be described with reference to the accompanying drawings.

Configuration

Figure 1:
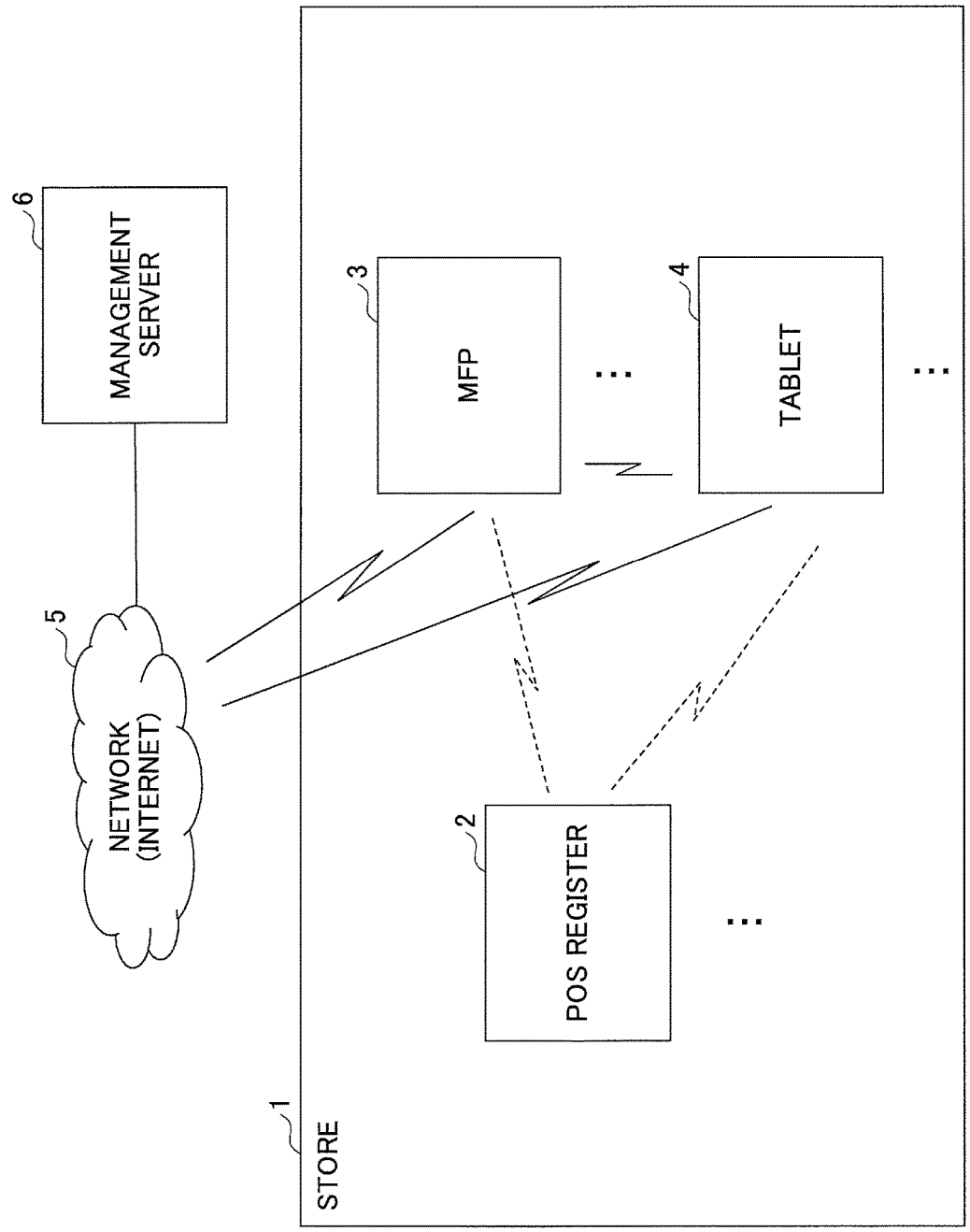
FIG. 1 is a schematic diagram illustrating an example of a system configuration according to an embodiment of the present disclosure.

FIG. 1 is a schematic diagram illustrating an example of a system configuration according to an embodiment of the present disclosure. As illustrated in FIG. 1, in a store 1, a POS register 2, a MFP (Multi-Function Peripheral, Multi-Function Printer) 3, and a tablet (tablet type terminal) 4 are disposed. It should be noted that two or more POS registers 2, two or more MFPs 3, and two or more tablets 4 may be disposed. Depending on a scale (size) of the store 1, the tablet 4 may be omitted. For example, in a case in which business operation can be performed sufficiently by the POS (point of sales) register 2 and the MFP 3, the tablet 4 may be omitted. Further, in a case in which the business operation can be performed sufficiently by the POS register 2 and the tablet 4, the MFP 3 may be omitted. In this case, a printer for printing documents is required. The MFP 3 and the tablet 4 are connected in a communicative manner via a wired or wireless LAN. The POS register 2 and the MFP 3 may be connected to the tablet 4 in a communicative manner wiredly or wirelessly. However, the POS register 2 and the MFP 3 do not have to be connected to the tablet 4 in the communicative manner.

The POS register 2 is an information processing apparatus (computer) for performing a transaction (accounting process) of commodity purchases. The POS register 2 is an example of an accounting management apparatus that manages accounting for one or more purchased commodities. The POS register 2 has a function to obtain information on one or more commodities that a purchaser purchases, and to calculate a total amount (price) of the commodities. Further, the POS register 2 has a function to issue, to the purchaser, one or more receipts in which names of the purchase commodities, unit prices, quantities, the total amount and the like are described. It should be noted that the receipt may be issued (printed) when the commodities are purchased. Further, in the present system, it is not limited to using the POS register 2. One or more standalone registers may be used.

The MFP 3 is an information processing apparatus having a scanner function, a printer function, and an information processing function. The MFP 3 is an example of an image processing apparatus that can execute an input/output process of an image such as scanning and printing. In the embodiment of the present disclosure, the scanner function is used to read the passport of a purchaser or writing (a qualification document equivalent to the passport such as a landing permit for crew members, an emergency landing permit, and a landing permit due to distress) that indicates qualification for entering a country to obtain an image of the passport or the writing. Further, the scanner function can be used to read the receipt and obtain an image of the receipt. It should be noted that a method for reading the image is not limited to the scanner function. For example, a camera function to capture (image) the image may be used instead.

Further, the printer function is used to generate and print images of documents (such as a record of purchase, a covenant of a purchaser, a list of consumable commodities) necessary for tax-exempt sale and images of documents for management in the store 1. It should be noted that the printing is an example of a method for outputting images. For example, an image storage unit that stores image data of these documents may be provided.

It should be noted that one MFP 3 does not have to both the scanner function and the printer function. For example, a scanner apparatus that has only a scanner function and a printer apparatus that has only a printer function may be arranged separately. That is, the housing of an image reading apparatus that executes reading of an image such as the scanner function and a housing of an image outputting apparatus that executes outputting of an image such as the printer function may be different or integrated.

The tablet 4 is an information processing apparatus that has a camera function and an information processing function. The tablet 4 is an example of an image obtaining apparatus that obtains an image. The camera function is used to image (capture) the passport of the purchaser or the writing, which represents the qualification for entering the country, to obtain the image of the passport or the writing. Further, the camera function can be used for imaging the receipt to obtain the image of the receipt. It should be noted that a method for reading the images is not limited to imaging. For example, a scanner function may be used to the read the images.

Further, the MFP 3 and the tablet 4 are connected to an external management server 6 via a network 5 such as the Internet. The management server 6 has a function to store data uploaded from the MFP 3 and the tablet 4 and to update programs and setting data of the MFP 3 and tablet 4 to the latest states (versions). It should be noted that in a case where external storage of the data and the update are implemented by another method, the management server may be omitted.

Figure 2:
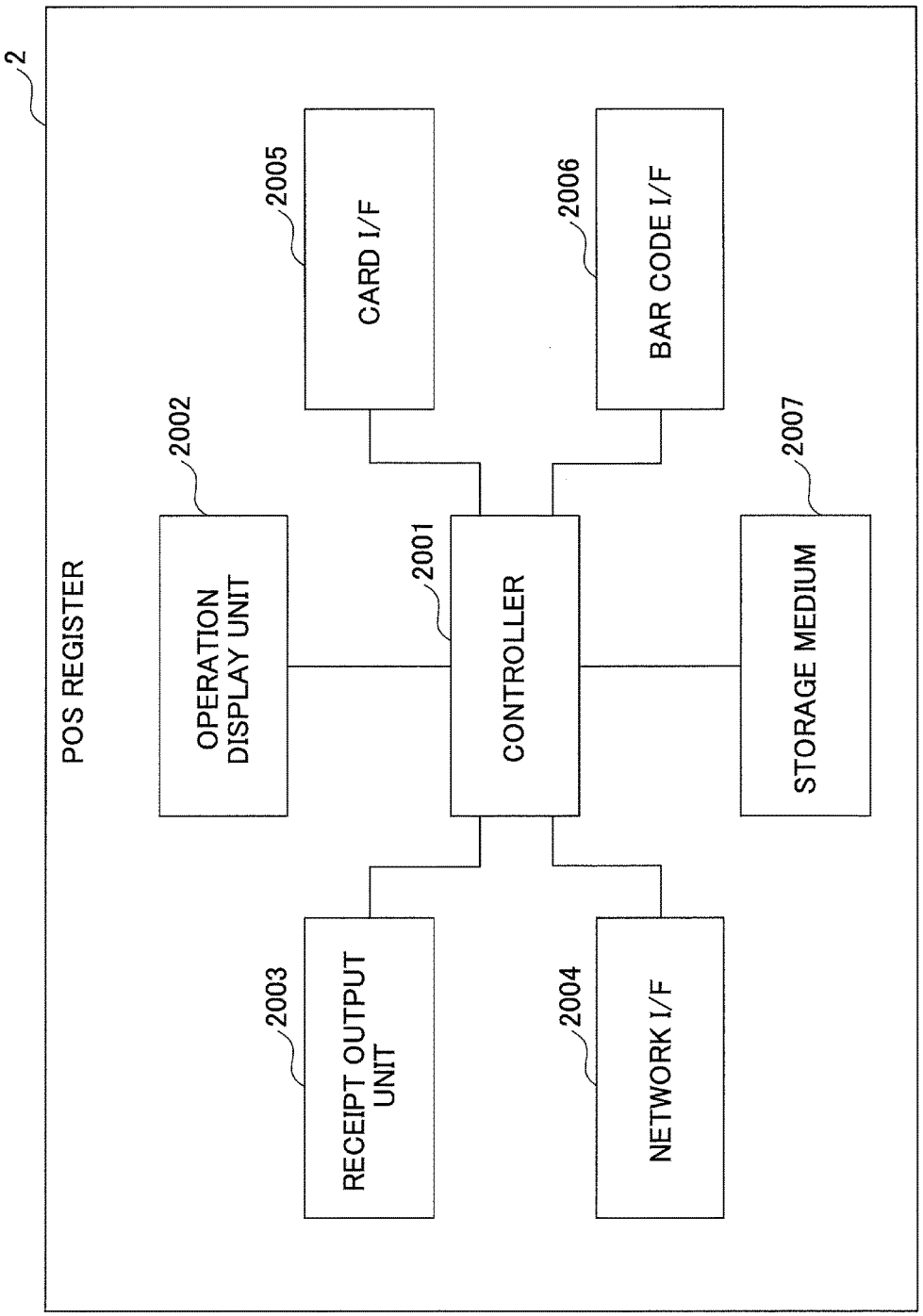
FIG. 2 a block diagram illustrating an example of a hardware configuration of a POS register.

FIG. 2 is a block diagram illustrating an example of a hardware configuration of the POS register 2. As illustrated in FIG. 2, the POS register 2 includes a controller 2001, an operation display unit 2002, a receipt output unit 2003, a network interface (I/F) 2004, a card I/F 2005, a bar code I/F 2006, and a storage medium 2007.

The controller 2001 controls overall operation of the POS register 2. The operation display unit 2002 receives data input by a ten-key and a special key and displays the input data, a processing result, a message and the like. The receipt output unit 2003 issues a receipt by printing. The network I/F 2004 is an interface for connecting the POS register 2 to an external device. The card I/F 2005 reads a credit card of a purchaser. The bar code I/F 2006 reads a barcode (such as one-dimensional code and two-dimensional code) attached to a commodity. The storage medium 2007 stores processing results and the like.

Figure 3:
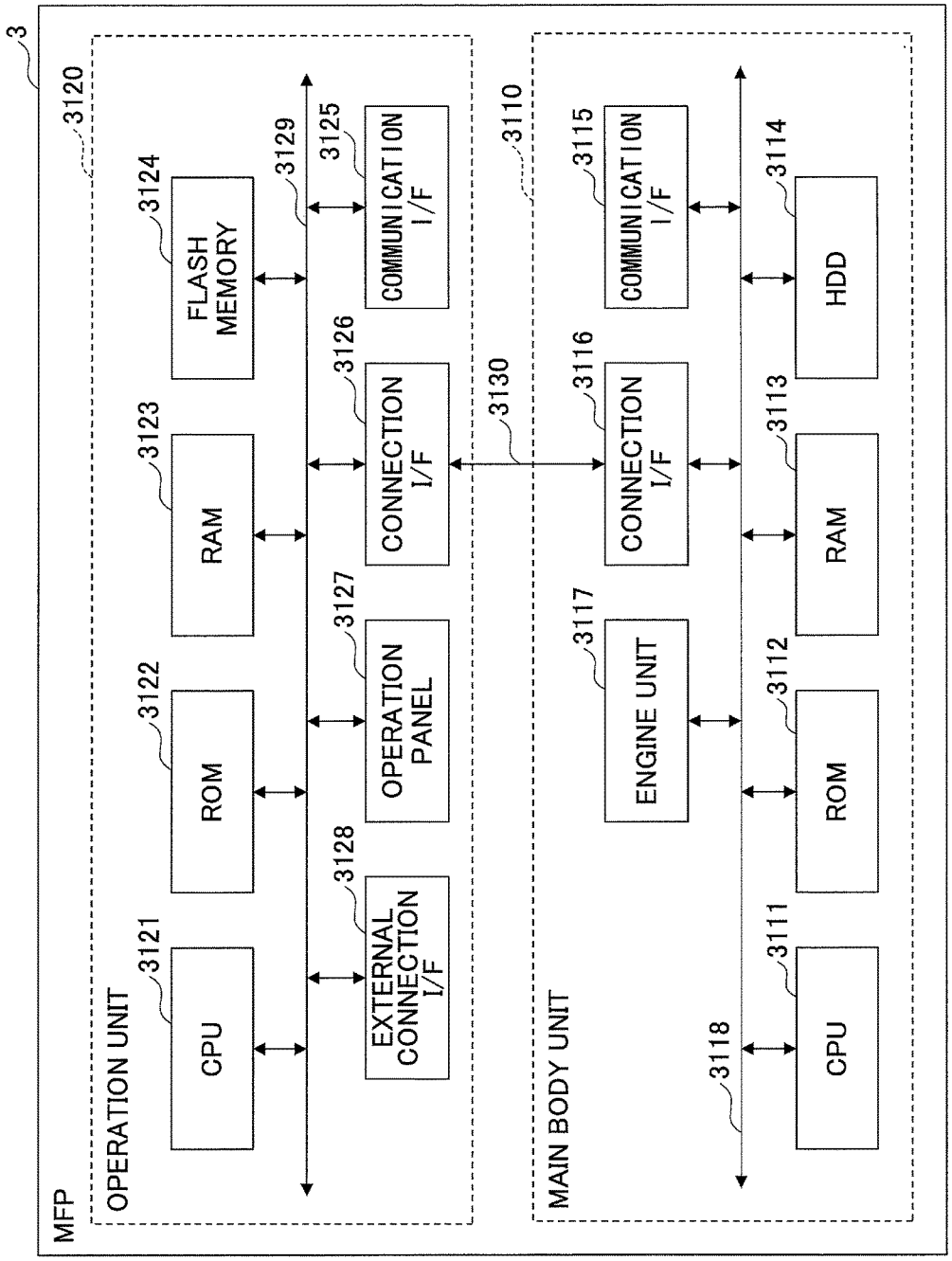
FIG. 3 is a block diagram illustrating an example of a hardware configuration of a MFP.

FIG. 3 is a block diagram illustrating an example of a hardware configuration of the MFP 3. As illustrated in FIG. 3, the MFP 3 includes a main body unit 3110 and an operation unit 3120. The main body unit 3110 can implement various functions including a copying function, a scanner function, a printer function, a document box function, and a utility function. The operation unit 3120 receives an operation of a user. The main body unit 3110 and the operation unit 3120 are connected in a communicative manner via a dedicated communication channel 3130. For example, universal serial bus (USB) standards may be used for the communication channel 3130. Further, arbitrary (wired or wireless) standards may be used. It should be noted that the main body unit 3110 can act in accordance with an operation received by the operation unit 3120. Further, the main body unit 3110 can communicate with an external device such as a client personal computer (PC) and act in accordance with an instruction received from the external device.

The main body unit 3110 includes a central processing unit (CPU) 3111, a read only memory (ROM) 3112, a random access memory (RAM) 3113, a hard disk drive (HDD) 3114, a communication interface (I/F) 3115, a connection I/F 3116, and an engine unit 3117. These units (elements) are connected via a system bus 3118.

The CPU 3111 controls overall operation of the main body unit 3110. The CPU 3111 uses the RAM 3113 as a work area and executes programs stored in the ROM 3112, the HDD 3114 or the like to control the overall operation of the main body 3110. For example, the CPU 3111 implements various functions such as the copying function, the scanner function, the document box function, and the utility function. The communication I/F unit 3115 is an interface for connecting the main body unit 3110 to the network 5. The connection I/F unit 3116 is an interface for communicating with the operation unit 3120 via the communication channel 3130. The engine unit 3117 is a hardware element for implementing the copying function, the scanner function, and the printer function. The engine unit 3117 executes processes other than versatile information processes and communication processes. The engine unit 3117 includes, for example, a scanner (image reading unit) that scans and reads an image of a document, and a plotter (image forming unit) that prints an image on a sheet (sheet material) such as a paper. Further, the engine unit 3117 may include a specific option unit such as a finisher unit that sorts printed sheets and an auto document feeder (ADF) that feeds documents automatically.

The operation unit 3120 includes a CPU 3121, a ROM 3122, a RAM 3123, a flash memory 3124, a communication I/F 3125, a connection I/F 3126, an operation panel 3127, and an external connection I/F 3128. These units (elements) are connected via a system bus 3129. The CPU 3121 controls overall operation of the operation unit 3120. The CPU 3121 uses the RAM 3123 as a work area and executes programs stored in the ROM 3112, the flash memory 3124 or the like to control the overall operation of the operation unit 3120. For example, the CPU 3121 implements various functions such as displaying of information (image) in accordance with an input received from a user. The communication (I/F) unit 3125 is an interface for connecting the operation unit 3120 to the network 5. The connection (I/F) unit 3126 is an interface for communicating with the main body unit 3110 via the communication channel 3130. The operation panel unit 3127 receives various kinds of input in accordance with the user operation, and displays various kinds of information (such as information that corresponds to the received operation, information that represents operation status of the MFP 3, and information that represents setting status). Moreover, an operation unit such as a hardware key and a display unit such as a lamp may be provided, additionally or alternatively. The external connection I/F unit 3128 is an interface for connecting the operation unit 3120 to a device such as an IC card reader.

Figure 4:
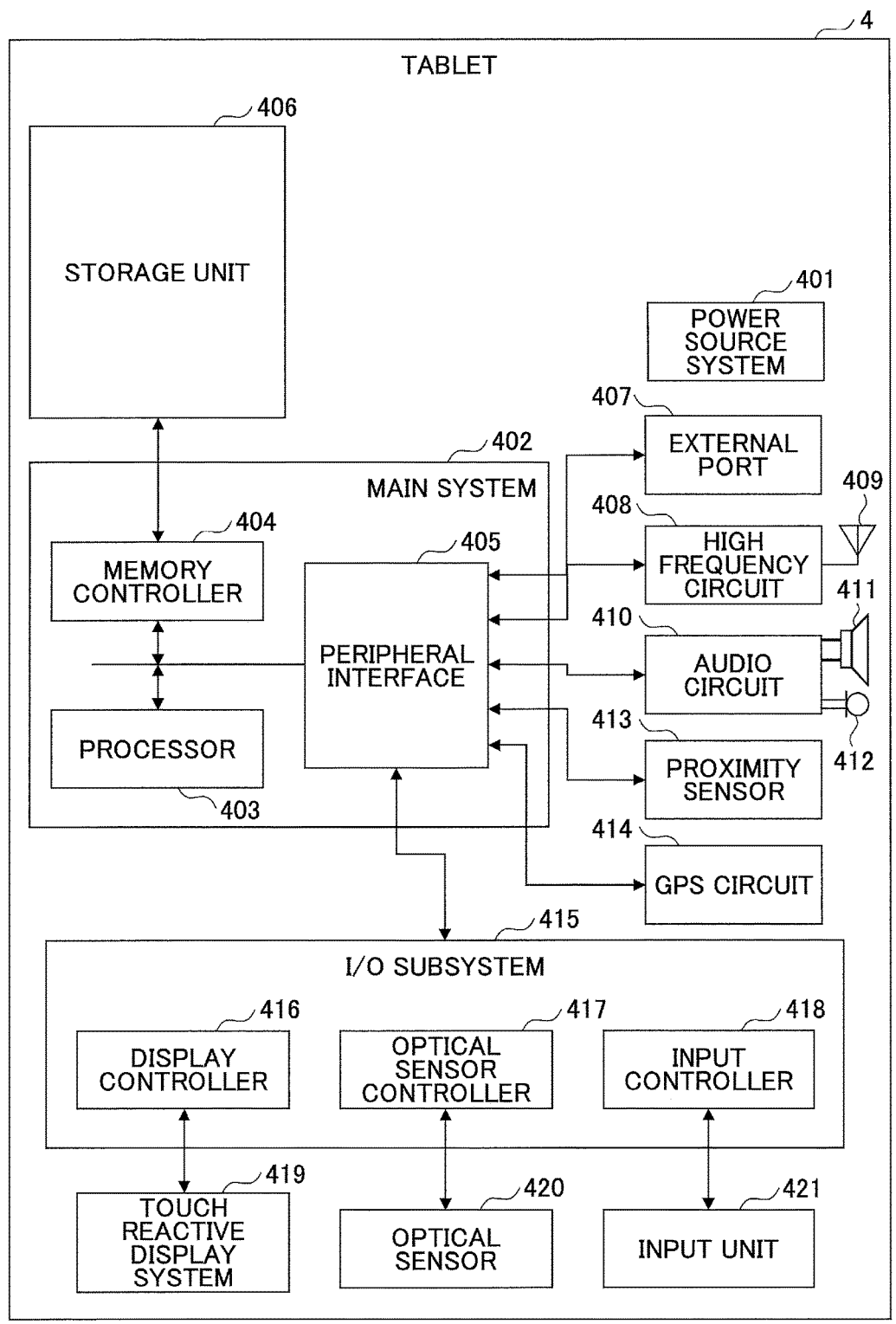
FIG. 4 is a block diagram illustrating an example of a hardware configuration of a tablet.

FIG. 4 is a block diagram illustrating an example of a hardware configuration of the tablet 4. As illustrated in FIG. 4, the tablet 4 includes a power source system 401, a main system 402 and a storage unit 406. The main system 402 includes a processor 403, a memory controller 404, and a peripheral interface 405. Further, the tablet 4 includes an external port 407, a high frequency circuit 408, an antenna 409, an audio circuit 410, a speaker 411, a microphone 412, a proximity sensor 413, and a global positioning system (GPS) circuit 414. Further, the tablet 4 includes an input/output (I/O) subsystem 415 and a touch reactive display system 419, an optical sensor 420, an input unit 421. The I/O subsystem 415 includes a display controller 416, an optical sensor controller 417, and an input controller 418.

Figure 5:
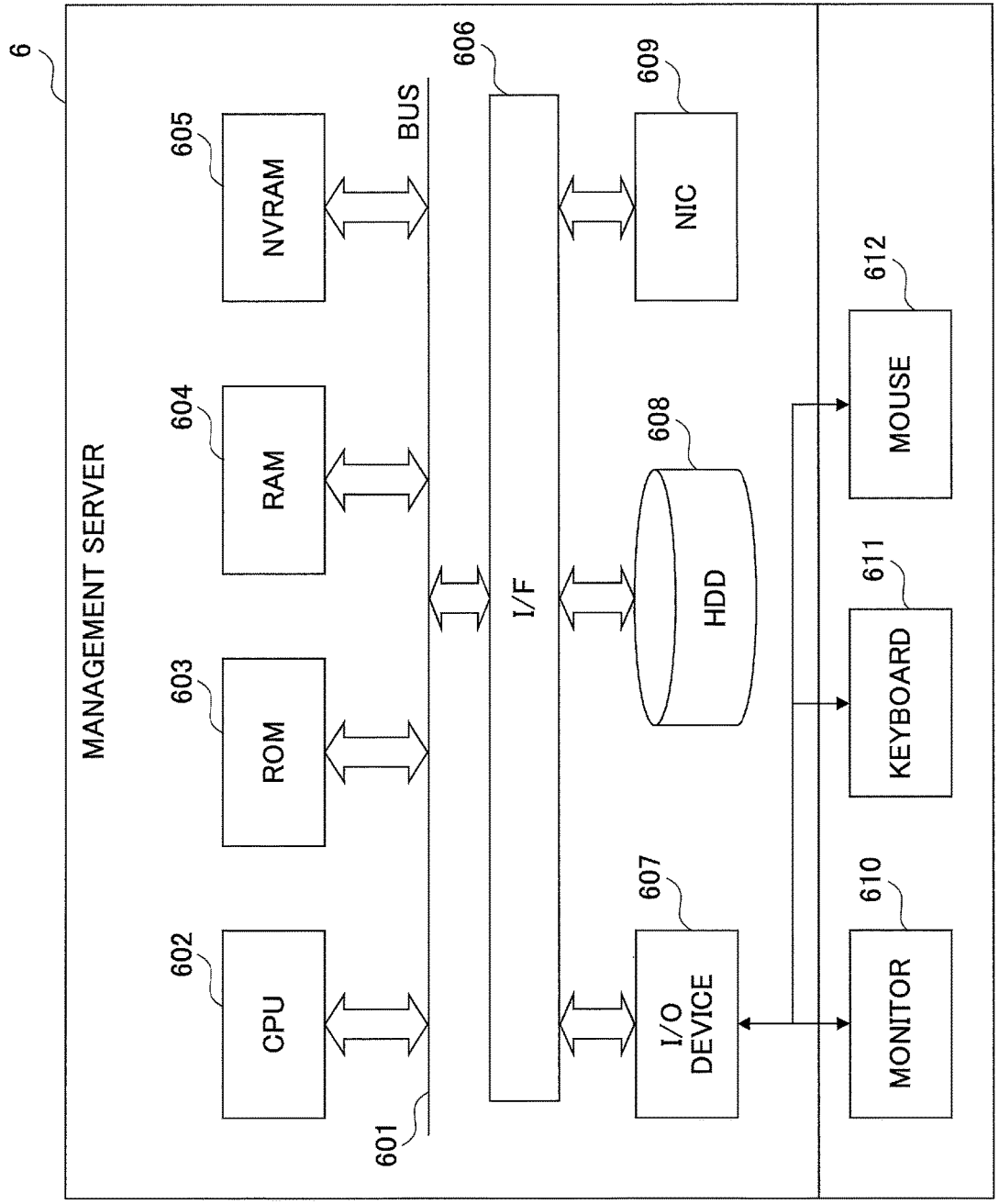
FIG. 5 is a block diagram illustrating an example of a hardware configuration of a management server.

FIG. 5 is a block diagram illustrating an example of a hardware configuration of the management server 6. As illustrated in FIG. 5, the management server 6 includes a central processing unit (CPU) 602, a read only memory (ROM) 603, a random access memory (RAM) 604, a non-volatile random access memory (NVRAM) 605. These units (elements) are connected via a system bus 601. Further, the management server 6 includes an interface (I/F) 606, an input/output (I/O) device 607, a hard disk drive (HDD) 608, a network interface card (NIC) 609, a monitor 610, a keyboard 611 and a mouse 612. The I/O device 607, the HDD 608, and the NIC 609 are connected to the I/F 606. The monitor 610, the keyboard 611, and the mouse 612 are connected to the I/O device 607. A Compact Disk/Digital Versatile Disk (CD/DVD) or the like can be connected to the I/O device 607.

Figure 6:
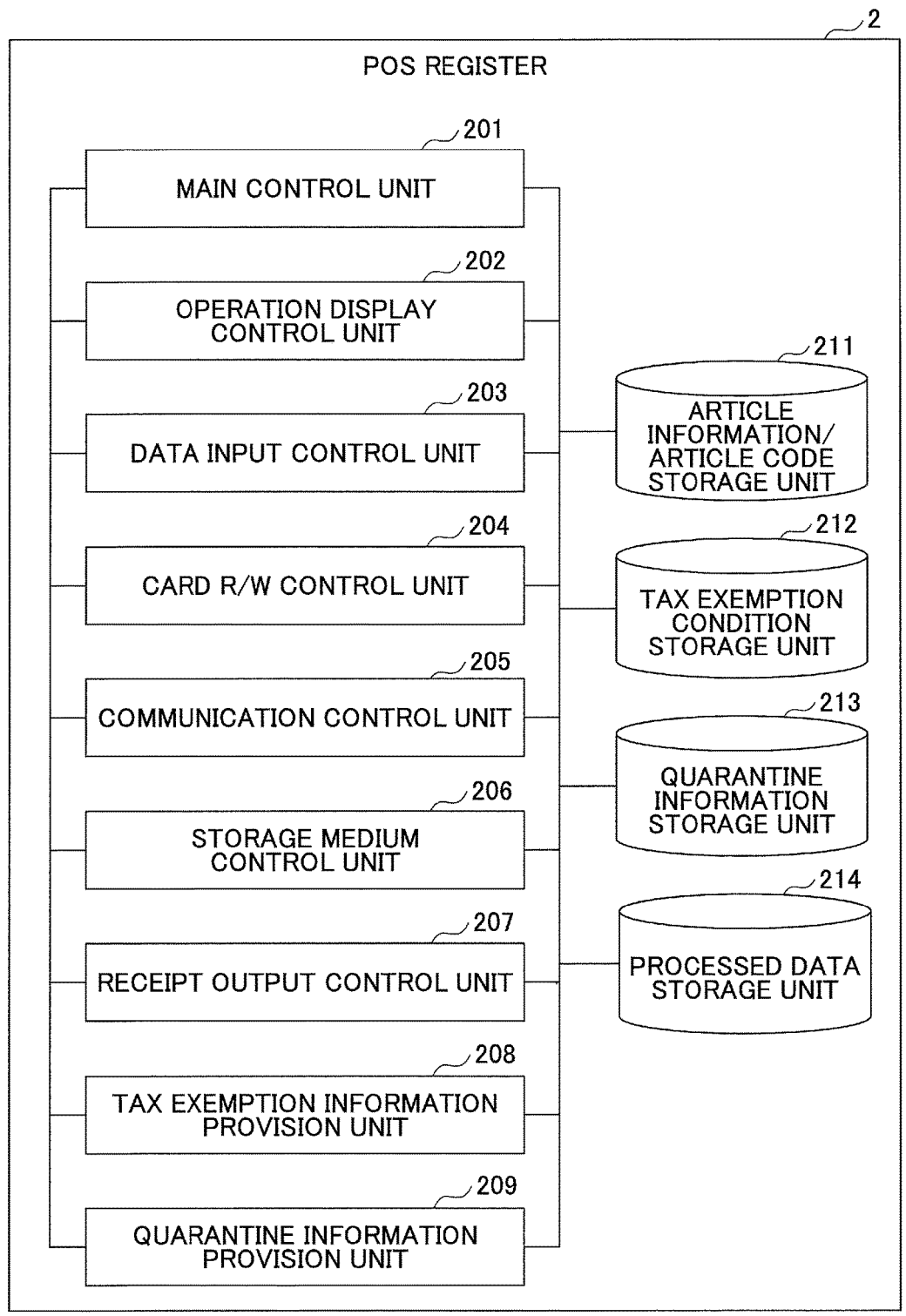
FIG. 6 is a block diagram illustrating an example of a software configuration of the POS register.

FIG. 6 is a block diagram illustrating an example of a software configuration of the POS register 2. As illustrated in FIG. 6, the POS register 2 includes a main control unit 201, an operation display control unit 202, a data input control unit 203, a card R/W control unit 204, a communication control unit 205, a storage medium control unit 206, a receipt output control unit 207, a tax exemption information provision unit 208, and a quarantine information provision unit 209. These elements may be implemented by a CPU of the controller 2001 (FIG. 2) executing computer programs. It should be noted that the programs may be provided by one or more recording media. Further, the programs may be provided via a network or embedded in the ROM and provided.

Further, the POS register 2 stores (includes) an article information/article code storage unit 211 and a tax exemption condition storage unit 212, a quarantine information storage unit 213, and a processed data storage unit 214 as data (information) to be referred/updated in processes. The article information/article code storage unit 211 stores information in which article information items are associated with one or more respective article codes (commodity codes). The article information items include, for respective commodities, names of the commodities, whether the commodities (or services) are subject to (eligible for) tax exemption, and whether the commodities are general commodities (commodities except consumable commodities) for the tax exemption or consumable commodities for the tax exemption. The tax exemption condition storage unit 212 stores information that represents, for the commodities that are subject to the tax exemption, one or more tax exemption conditions for being subject to the tax exemption in accordance with whether the commodities are the general commodities for the tax exemption or the consumable commodities for the tax exemption. For example, in a case in which a total purchase amount (price) of one or more general commodities for a single day in the same store is equal to or greater than 10,001 (tax excluded) Japanese yen, the general commodities are subject to the tax exemption. In a case in which a total purchase amount (price) of one or more consumable commodities for a single day in the same store is between 5,001 and 500,000 (tax excluded) Japanese yen, the consumable commodities are subject to the tax exemption. The quarantine information storage unit 213 includes information on whether quarantine measures are required in a home country to which a purchaser takes one or more commodities (consumable items such as food items) back, information on whether it is prohibited to take back the commodities as hand baggage or to take back the commodities by courier and information on substitute commodities (such as other commodities that are subject to the tax exemption). The processed data storage unit 214 stores information on a result (equivalent to information described in a receipt) of an adjustment process.

The main control unit 201 has a function to control overall operation of the POS register 2. The operation display control unit 202 has a function to control displaying in the operation display unit 2002 (FIG. 2). The data input control unit 203 has a function to control data input from the operation display unit 2002 and the bar code I/F 2006 (FIG. 2). The card R/W control unit 204 has a function to control data input from the card I/F 2005 (FIG. 2). The communication control unit 205 has a function to control communication by the network I/F 2004 (FIG. 2). The storage medium control unit 206 has a function to control reading/writing of data from/to the storage medium 2007 (FIG. 2). The receipt output control unit 207 has a function to control printing of a receipt by the receipt output unit 2003 (FIG. 2).

The tax exemption information provision unit 208 has a function to provide, with reference to the article information/article code storage unit 211 and the tax exemption condition storage unit 212, information that represents that one or more commodities are subject to the tax exemption depending on a purchase amount. The quarantine information provision unit 209 has a function to provide, with reference to the quarantine information storage unit 213, quarantine information (whether quarantine measures are required, whether it is prohibited to take back the commodity as hand baggage or to take back the commodity by courier and substitute commodities) depending on a purchase commodity and a home country to which a purchaser takes the commodity back.

Figure 7:
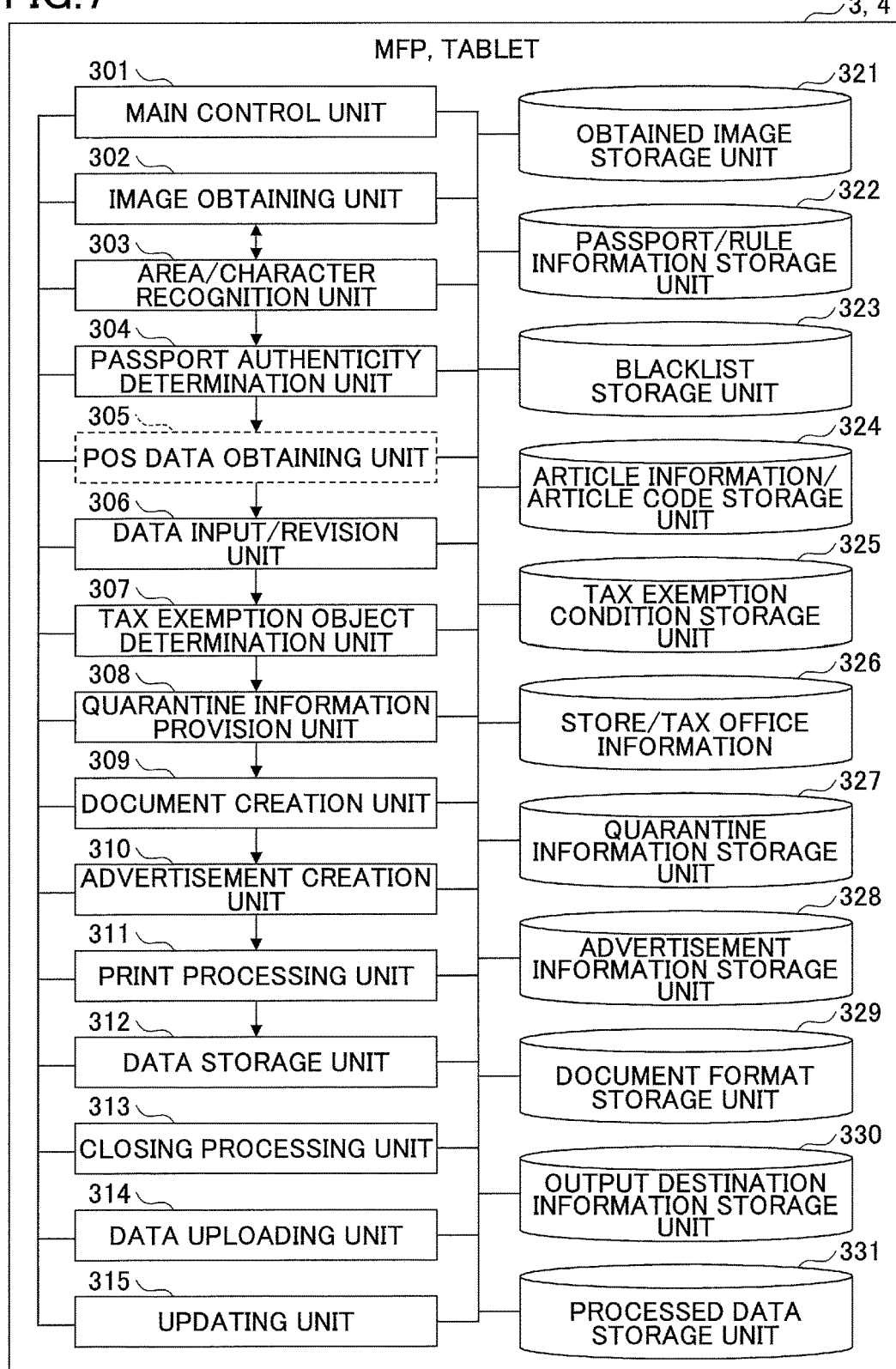
FIG. 7 is a block diagram illustrating an example of a software configuration of the MFP and the tablet.

FIG. 7 is a block diagram illustrating an example of a software configuration of the MFP 3 and the tablet 4. As illustrated in FIG. 7, the MFP 3 and the tablet 4 includes a main control unit 301 an image obtaining unit 302, an area/character recognition unit 303, a passport authenticity determination unit 304, a data obtaining unit 305, a data input/revision unit 306, and a tax exemption object determination unit 307. Further, the MFP 3 and the tablet 4 include a quarantine information provision unit 308, a document creation unit 309, an advertisement creation unit 310, a print processing unit 311, a data storage unit 312, a closing processing unit 313, a data uploading unit 314, an updating unit 315. These elements may be implemented by the CPU 3121, 3111 (FIG. 3) or the processor 403 (FIG. 4) executing computer programs. It should be noted that the programs may be provided by one or more recording media. Further, the programs may be provided via a network or embedded in the ROM and provided.

Further, the MFP 3 and the tablet 4 store, as data (information) to be referred and updated in processes, an obtained image storage unit 321, a passport/rule information storage unit 322, a blacklist storage unit 323, an article information/article code storage unit 324, a tax exemption condition storage unit 325, and a store/tax office information storage unit 326. Moreover, the MFP 3 and the tablet 4 include a quarantine information storage unit 327, an advertisement information storage unit 328, a document format storage unit 329, an output destination information storage unit 330, and a processed data storage unit 331.

The obtained image storage unit 321 temporarily stores (holds) an image of a passport and an image of a receipt obtained by the image obtaining unit 302. The passport/rule information storage unit 322 includes, for a passport of each country and each version, passport information. The passport information includes position information on a position (area in which identification information of a country is described among an image of a passport) in which a nationality, which is identification information for identifying the country, is described in the passport and designates a value of the identification information of the country. The value is a description content, which should be described in the position. Moreover, for each country and each version, the passport information includes, names of information items, position information on positions in which the information items are described, and preset values (if present) of the information items, in order to obtain information (information on the nationality and the like), required for applying for the tax exemption such as a passport number, a full name, and a date of birth, whose described positions are decided with respect to a reading object (a predetermined page of the passport).

Because a standard format of a passport is not common in the whole world and a described position of each information item may differ depending on the country and a version (edition), the passport/rule information storage unit 322 includes the passport information for each country and each version. It should be noted that the passport/rule information storage unit 322 does not have to include the passport information for each country and each version, in a case in which the position information is set in accordance with a classification of a standard format of a passport and it is only required to correspond to the standard format of one type.

Further, the passport/rule information storage unit 322 includes rule information that represents one or more rules that description contents (including such as a watermark symbol and figure) satisfy as a genuine passport. For example, as a rule in Japan, a passport number is a combination of 2 alphabet characters and a 7 digit number, a five year passport starts from an initial character "M", a ten year passport starts from an initial character "T". Other countries may have similar rules. That is, a different rule may be set for each country. It is included in the rule information includes that predetermined description contents are described in predetermined positions. It should be noted that the passport/rule information storage unit 322 include similar information for a landing permit for crew members, an emergency landing permit, and a landing permit due to distress other than the passport. The black list storage unit 323 stores information on a number (one or more numbers) when an inquiry (such as a report and a caution) or a reminder of tax payment is made to a store from a tax office due to a problem of the passport used in the past for purchasing tax-free commodities. The information stored in the black list storage unit 323 is shared between traders.

The article information/article code storage unit 324 stores information in which article information items are associated with one or more respective article codes (commodity codes). The article information items include, for respective commodities, names of the commodities, whether the commodities (or services) are subject to (eligible for) tax exemption, and whether the commodities are general commodities (commodities except consumable commodities) for the tax exemption or consumable commodities for the tax exemption. The tax exemption condition storage unit 325 stores information that represents, for the commodities that are subject to the tax exemption, one or more tax exemption conditions for being subject to the tax exemption in accordance with whether the commodities are the general commodities for the tax exemption or the consumable commodities for the tax exemption. For example, in a case in which a total purchase amount (price) of one or more general commodities for a single day in the same store is equal to or greater than 10,001 (tax excluded) Japanese yen, the general commodities are subject to the tax exemption. In a case in which a total purchase amount (price) of one or more consumable commodities for a single day in the same store is between 5,001 and 500,000 (tax excluded) Japanese yen, the consumable commodities are subject to the tax exemption. Further, the tax exemption condition storage unit 325 includes information that represents it is required to store a copy of the passport in a case in which a total purchase amount of the one or more general commodities for the single day in the same store exceeds 1,000,000 (tax excluded) Japanese yen. The store/tax office information storage unit 326 stores information on a name of the store (tax free store) 1, a name of a manager, a place for tax payment, a name of a tax office and the like. The quarantine information storage unit 327 includes information on whether quarantine measures are required in a home country to which a purchaser takes one or more commodities (consumable items such as food items) back, information on whether it is prohibited to take back the commodities as hand baggage or to take back the commodities by courier and information on substitute commodities (for example, in a case in which import of European pears is prohibited, other pears are substitute commodities). The advertisement information storage unit 328 stores information on one or more advertisements printed with documents for tax-exempt sale provided (recommended) to the purchaser. The advertisement is associated with a nationality, an age, a sex, names of one or more purchase commodities, a purchase price, and the like. The advertisement can be created in a language in accordance with a plurality of nationalities. It is preferable to create the advertisement in both English language and the language corresponding to the nationality. Usable languages (handling languages) may be English language, Korean language, Chinese language, Formosan language, Spanish language, Portuguese language, German language, French language, Italian language, Russian language, and the like. Even if the number of usable languages is small at first, the usable languages may be increased in accordance with actual situations of customers. Further, the usable languages are not limited to those described above. Usable languages may be determined as needed It should be noted that similar to the advertisement information, the documents for the tax exemption and the quarantine information may be created in a plurality of languages.

The document format storage unit 329 stores information on forms of documents for tax-exempt sale (a record of purchase, a covenant of a purchaser and a list of consumable commodities, for example). In the document format storage unit 329, item names and notes of caution are stored in a plurality of languages. In this way, a language corresponding to a nationality of a purchaser is selected. At this time, it is preferable to write in a language in accordance the nationality of the purchaser along with a default language (a vernacular language of a country in which a store is located or a language primarily used in the country. In Japan, Japanese language and/or English language may be default language). (It should be noted that although document formats corresponding to all languages may be stored, prepared (usable) languages may be determined arbitrarily. For example, Japanese language, English language, Chinese language, and Spanish language may be stored and information that designates a language to be selected (used) in accordance with a nationality may be registered in advance. In this way, a language corresponding to a specific nationality can be determined and the document format(s) (item names and notes of caution) in the determined language can be used.

The output destination information storage unit 330 includes information on a device (in a case in which the MFP 3 is used, the device is the MFP 3) that prints the documents for the tax-exempt sale and the advertisement information, and information on a temporary or permanently storage destination (such as a path of a folder regardless of a location (within the own device or in an external device)) of processed data. The processed data storage unit 331 stores data of a creation result of the documents for the tax-exempt sale and data in the course of processes.

The main control unit 301 has a function to control overall operation of the MFP 3 and the tablet 4. The image obtaining unit 302 has a function to obtain images from a passport and a receipt. The function is the scanner function in a case in which the MFP 3 is used. Further, the function is the camera function in a case in which the tablet 4 is used. It should be noted in a case in which the scanner function of the MFP 3 is used, the image is definitely obtained by the scanning operation. In a case in which the camera function of the tablet 4 is used, an image being photographed (captured) within a field of view of the camera is displayed on a monitor of the tablet 4 when the camera function starts operating. Then, when a shutter button is pushed or a predetermined condition is satisfied, the image is definitely obtained.

The area/character recognition unit 303 has a function to recognize, from the image of the passport (or the writing that represents the qualification for entering the country) and the image of the receipt obtained by the image obtaining unit 302, characters, figures, and symbols (including a code) described in the images. It should be noted that in a case in which the camera function is used, an image being photographed before being obtained definitely can be recognized. It should be noted that the area/character recognition unit 303 may recognize, based on information in which description positions and description items of an existing passport (or writing) are associated, described contents of the passport (or the writing) from the image obtained by the image obtaining unit 302. In a case in which the recognition is performed from the image obtained definitely by the scanner function or the camera function, an outline of a sheet (paper) is recognized from the image to recognize the characters, the figures, and the symbols described in the outline. At this time, for the read image of the passport, names of items and description contents described in predetermined description positions are output with reference to the passport information of the passport/rule information storage unit 322. Further, the area/character recognition unit 303 confirms the description contents to discriminate the country of the passport. In a case in which the recognition is performed from the image being photographed (captured) by the camera function, a code entered in a predetermined recognition frame on the monitor display is recognized. In a case in which only performing the recognition is required and it is not required to store the image, obtaining the image is not performed.

The passport authenticity determination unit 304 has a function to determine, based on the description contents recognized by the area/character recognition unit 303, whether the passport is genuine and valid with reference to the rule information of the passport/rule information storage unit 322 and the black list storage unit 323. It should be noted that the passport authenticity determination unit 304 can use hardware (switch detection light by a filter or switch illumination light) corresponding to metallic pair inks (including a pair of inks whose color-producing components are different, though appearance colors are normal) or the like used in passports. Thereby, the passport authenticity determination unit 304 can determine authenticity of the passport based on a difference of a detected (obtained) predetermined image.

The data obtaining unit 305 has a function to obtain data described in a receipt in a case where the POS register 2 and the MFP 3 or the tablet 4 can be connected in a communicative manner. It should be noted that a receipt number described (written) in an issued receipt is used to identify the receipt. By making a request for obtaining data to the POS register 2 while designating the receipt number, the data related to the receipt of the receipt number can be obtained.

The data input/revision unit 306 has a function to receive input of information, such as a status of residence and a date of landing, that cannot be obtained (has not been obtained) from the image of the passport. Further, the data input/revision unit 306 has a function to receive revision of the description contents of the passport and the receipt automatically recognized by the area/character recognition unit 303 and revision of processing information based on them to perform the revision. In other words, price information on selling prices of commodities can be obtained by the data obtaining unit 305 and/or the data input/revision unit 306. Further, the data input/revision unit 306 can receive information (prices and the like) on commodities entered into the system. The tax exemption object determination unit 307 has a function to determine, for the general commodities and the consumable commodities, one or more commodities that are subject to the tax exemption based on the processing results of the area/character recognition unit 303 and the passport authenticity determination unit 304 with reference to the tax exemption condition storage unit 325. The tax exemption object determination unit 307 calculates an amount (price) of tax exemption for the purchase commodities. The tax exemption object determination unit 307 can determine one or more commodities that are subject to the tax exemption using the recognized image of the receipt. The quarantine information provision unit 308 has a function to provide, with reference to the quarantine information storage unit 327, quarantine information (whether quarantine measures are required, whether it is prohibited to take back the commodity as hand baggage or to take back the commodity by courier and substitute commodities) depending on a purchase commodity and the home country to which a purchaser takes the commodity. It should be noted that in the case in which purchase of one or more commodities are stopped or switched to purchase other commodities based on the quarantine information, adjustment processes in the POS register 2 are performed again or adjustment contents are revised.

The document creation unit 309 has a function to create, with reference to the document format storage unit 329, data of the documents for the tax-exempt sale (a record of purchase, a covenant of a purchaser and a list of consumable commodities) based on the information on the one or more commodities that are subject to the tax exemption determined by the tax exemption object determination unit 307 and the information obtained from the passport or the like. In the document format, for each document and each language, fields for inserting predetermined contents and data are provided. The names of the commodities that are determined as the tax exemption objects, unit prices of the commodities, the quantities of the commodities, the total amount (price), a passport number extracted from the passport, a full name, information manually input, and predetermined information set in the store/tax office information storage unit 326 are inserted. The advertisement creation unit 310 has a function to create data of one or more advertisement documents based on at least one of the nationality, the sex, names of purchase commodities, the purchase amount and the like with reference to the advertisement information storage unit 328. The print processing unit 311 has a function to cause a printing apparatus, represented by an output destination set in the output destination information storage unit 330, to print one or more documents (one or more tax documents) for the tax-exempt sale created by the document creation unit 309 and the advertisement document created by the advertisement creation unit 310. The print processing units 311 causes the printing apparatus to print the documents for the tax-exempt sale for one or more relating commodities using one or more described contents (written contents) of a passport or writing (qualification document) that represents a qualification for entering a country recognized by the area/character recognition unit 303. Further, the document creation unit 309 or the print processing unit 311 can determine, based on the price information on the selling prices of the commodities obtained by the data obtaining unit 305 and/or the data input/revision unit 306, whether an image of the passport or the writing, included in an image that has been obtained by the scanner function or the camera function of the image obtaining unit 302, should be printed with the documents for the tax-exempt sale. It should be noted that the advertisement document may be printed on another sheet (paper) that is different from the documents for the tax-exempt sale. The data storage unit 312 has a function to store, in the processed data storage unit 331, information on the printed documents for the tax exemption and the advertisement document, or information in the course of processes.

The closing processing 313 has a function to cause the printing apparatus, represented by the output destination set in the output destination information storage unit 330, to print, in accordance with an operation of a store clerk at closing time of a day or an arrival of a predetermined time, a list of tax exemption processing cases for the day. The data uploading unit 314 has a function to upload and transmit, to the management server 6 at a predetermined timing (such as at midnight), data and information stored in the processed data storage unit 331 such that the processed data storage unit 331 of the MFP 3 and the tablet 4 is not filled up or to back up the data and the information. The updating unit 315 has a function to confirm, at a predetermined timing, whether the latest version's program and/or the data is released in the management server 6 and to download the latest version's program and/or the data from the management server 6 to perform the update in a case in which the latest version's program and/or the data is released.

Figure 8:
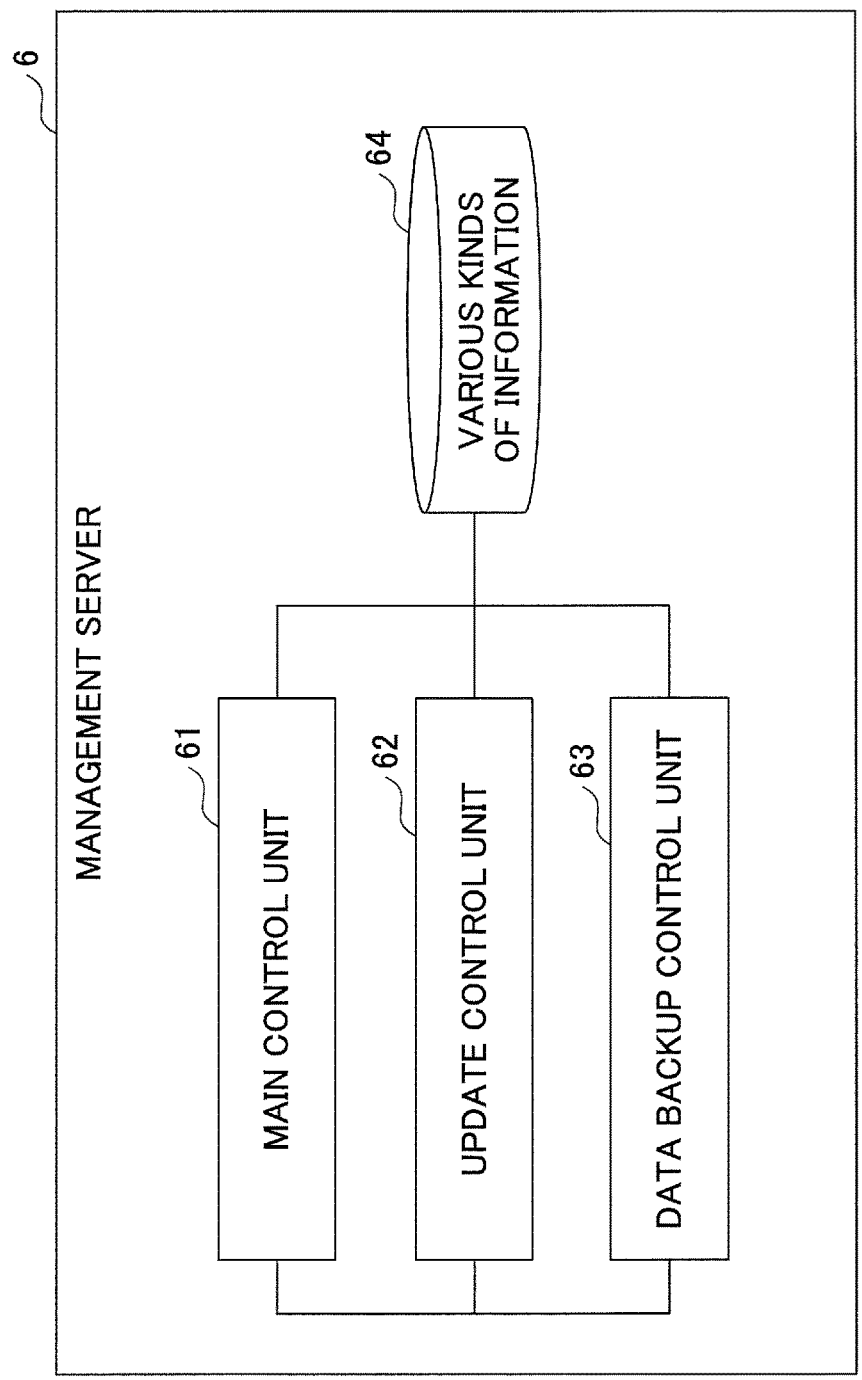
FIG. 8 is a block diagram illustrating an example of a software configuration of the management server.

FIG. 8 is a block diagram illustrating an example of a software configuration of the management server 6. As illustrated in FIG. 8, the management server 6 includes a main control unit 61, an update control unit 62, and a data backup unit control 63. These elements may be implemented by the CPU 602 (FIG. 5) executing computer programs. It should be noted that the programs may be provided by one or more recording media. Further, the programs may be provided via a network or embedded in the ROM and provided. Further, the management server 6 stores various kinds of information as data (information) to be referred/updated in the processing. The various kinds of information 64 include programs and data for update, and data uploaded from the MFP 3 or the tablet 4 for backup.

The main control unit 61 has a function to control overall processes in the management server 6. The update control unit 62 has a function to provide the latest version's program and/or data stored in the various kinds of information 64 in response to a request from the MFP 3 or the tablet 4. The data backup unit control 63 has a function to store the data uploaded from the MFP 3 or the tablet 4 in the various kinds of information 64.

Operation

FIG. 9 is a sequence chart illustrating an example of processes executed by the above described embodiment. It should be noted that order of the processes may be changed arbitrarily as long as a contradiction of process contents does not occur. Further, a process that does not requires cooperation with other processes may be executed singly and separately from the other processes.

As illustrated in FIG. 9, when a purchaser selects commodities to be purchased from commodities located in a store, and requests to purchase the purchase target commodities by bringing the purchase target commodities to the POS register 2, a store clerk, who operates the POS register 2, inputs the purchase target commodities in step S101.

Specifically, the store clerk causes the bar code I/F 2006 or the like to read barcodes attached to the respective commodities. Subsequently, with reference to the article information/article code storage unit 211 and the tax exemption condition storage unit 212, the tax exemption information provision unit 208 determines (discriminate) whether the input purchase target commodities are general commodities that are subject to the tax exemption or consumable commodities that are subject to the tax exemption. In a case in which at least part of the input purchase target commodities are subject to the tax exemption depending on a total purchase amount (price) of the general commodities or a total purchase amount (price) of the consumable commodities (in a case in which the total amount satisfies an applicable condition for applying for the tax exemption), the tax exemption information provision unit 208 provides information to that effect in step S102. For example, in a case in which the total purchase amount of the general commodities exceeds 10,000 Japanese yen in a single transaction process or a total purchase amount of the consumable commodities exceeds 5,000 Japanese yen in a single transaction process, information that represents a chance of the tax exemption can be reported to the purchaser from an operator (store clerk) by displaying an alert on a screen of the POS register 2. Even when the applicable condition for the tax exemption is not satisfied in the single transaction process, because there is a likelihood that the applicable condition can be satisfied in a case in which commodities are purchased separately in a plurality of times on the same day, the operator may notify the purchaser of information to that effect.

Further, in step S103, with reference to the quarantine information storage unit 213, the quarantine information provision unit 209 provides quarantine information (whether quarantine measures are required, whether it is prohibited to take back the commodities as hand baggage or to take back the commodities by courier and substitute commodities) depending on the purchase commodities and a home country to which the purchaser takes the commodities back. The information on the home country may be input manually. Further, without inputting the home country, general information on countries with limits and on precaution may be provided. In this way, to the purchaser, it becomes known that quarantine measures are necessary or the commodities cannot be taken back to the home country. Thus, unnecessary purchases can be prevented and trouble at a later date can be prevented. Further, because the substitute commodities can be posted (notified), an opportunity loss of sale can be reduced. It should be noted that because operation about the quarantine changes at irregular intervals and it is difficult for the purchaser and the clerk of the tax free store to accurately grasp the operation about the quarantine, systematic provision of the information can be valuable advice.

Then, when accounting for the purchases target commodities is completed and the purchase is decided, the receipt output control unit 207 performs printing of a receipt in step S104.

After that, the purchaser goes to a space prepared for application for the tax exemption, and hands the receipt and the passport to a store clerk, who receives the application for the tax exemption. At this time, as described above, the receipt is not always one sheet. The store clerk confirms the face of the purchaser and the face photograph of the passport. In a case in which the store clerk determines that it is the same person (the faces match), in the space in which the MFP 3 or the table 4 is arranged, images of the receipt and the passport (or the writing equivalent to the passport) read by using the scanner function of the MFP 3 or the imaging (camera) function of the tablet 4 are obtained in steps S105 and S106.

In a case in which cooperation (data sharing of the receipt) of data with the POS register 2 can be performed, the store clerk may input the receipt number and the like directly, for example. In this case, obtaining the image of the receipt may be omitted because described contents of the receipt can be obtained as data by using the input information (receipt number) as a key. Further, in a case in which the receipt number is described in a predetermined format, the receipt number may be obtained from the image of the receipt. Although the store clerk receives and reads the receipt and the passport in the above description, the purchaser may read the receipt and the passport.

Figure 10A:
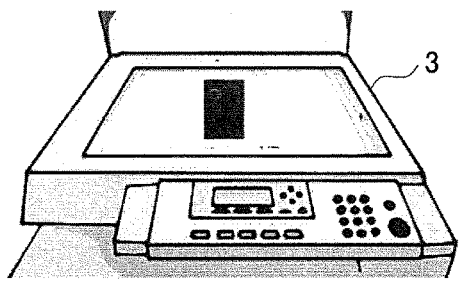
FIGS. 10A to 10E are diagrams illustrating examples in which images of a passport and a receipt(s) are obtained.
Figure 10B:
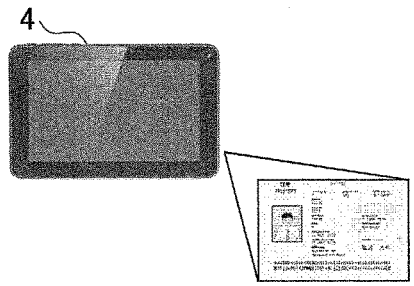
Figure 10C:
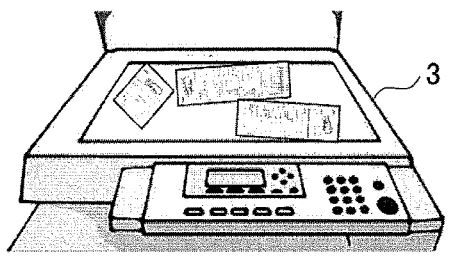
Figure 10D:
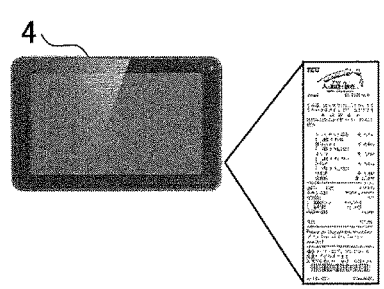
Figure 10E:
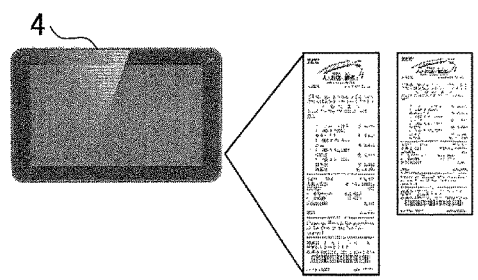

FIGS. 10A to 10E are diagrams illustrating examples in which the images of the passport and the receipt(s) are obtained. FIG. 10A illustrates an example in which the passport is scanned by the MFP 3. FIG. 10B illustrates an example in which the passport is photographed by the camera of the tablet 4. FIG. 10O illustrates an example in which a plurality of receipts are scanned by the MFP 3. FIG. 10D illustrates an example in which the receipt of one sheet (paper) is photographed by the camera of the tablet 4. FIG. 10E illustrates an example in which a plurality of receipts are photographed by the camera of the tablet 4. It should be noted that the passport and the receipt(s) may be scanned by the MFP 3 at the same time or photographed (captured) by the tablet 4 at the same time.

That is, because reading can be performed by both the MFP 3 and the tablet 4, an arrangement of the apparatuses and a configuration of the system may be determined in accordance with an environment. Further, two or more MFPs 3 and two or more tablets 4 may be prepared (arranged). For example, the MFP 3 may be arranged for reading the passport and the receipt, and the tablet 4 may be arranged for the purchaser and the store clerk to perform manual input. Further, the tablet 4 for the purchaser and the tablet 4 for the store clerk may be arranged. It should be noted that if the reading can be performed by the tablet 4, the MFP 3 does not have to be arranged. It should be noted that in a case in which the tablet 4 is used to photograph the receipt, it is preferable to photograph the receipt while sandwiching the receipt with a clear holder or the like because it is difficult to perform the photographing accurately when the receipt is curled.

Referring back to FIG. 9, in step S107, the area/character recognition unit 303 recognizes outlines of the sheets from the images obtained by the image obtaining unit 302, and recognizes characters, figures, and symbols described in the outlines. More specifically, first, the area/character recognition unit 303 refers to the passport information set for each country and each version first, and based on position information (position information associated with a value of identification information of a country in the passport information) on a position in which identification information of a country should be described, extracts, from the image of the passport obtained by the image obtaining unit 302, a description content described in an area represented by the position information. Next, the area/character recognition unit 303 determines whether the extracted description content is the value of the identification information of the country. If matched, it indicates that the country of the obtained image of the passport can be discriminated.

If not matched, processes are executed again in which the area/character recognition unit 303 extracts, based on position information on a position in which identification information of another country should be described, a description content described in an area represented by the position information to determine whether the extracted description content is the value of the identification information of the other country. In a case in which it is determined that the extracted description content does not match passport information of every country and every version among the passport/rule information storage unit 322, it is reported to the store clerk (or the purchaser) an error representing that the country of the passport cannot be specified. When receiving the error, the store clerk reports to the purchaser that the application for the tax exemption cannot be handled. Alternatively, the passport may be confirmed visually and manual input may be selected (performed) using the tablet 4.

In a case in which the country is discriminated, next, the area/character recognition unit 303 refers to the passport information corresponding to the discriminated country. Then, information required for applying for the tax exemption such as a passport number, a full name, and a date of birth is extracted based on position information (and preset values, if present) corresponding to an item name of each information item. In this way, from the image of the passport, described contents of at least part of items of the information required for the application for the tax exemption are extracted and obtained.

From the obtained image of the receipt, information on each of the purchased commodities is extracted. First, from the image of the receipt of one sheet obtained by the recognition process of the outline, information on a name of the store (or identification information for identifying the store) and information on the purchase date and time are obtained. Next, information on each of the purchased commodities described in the obtained image of the receipt is obtained. Because the receipt has a description structure of a fixed format (for example, from top to bottom, a store name, a date and time, commodities, a total are described), these information can be obtained based on position information and area designation information that are registered in advance.

For example, information (such as the store name and the date and time) described in locations decided from a predetermined position of the receipt is registered as the position information. As for items such as commodities whose description areas are changed in accordance with the number of purchased commodities in a single transaction, an area and a description structure describing information on one commodity are designated, and information on a designation area is extracted from a location (position where description of information on a first commodity is started) decided from the predetermined position (top edge) of the receipt. Further, information on a designation area decided from a bottom edge of the extracted information is extracted. In this way, by repeating processes as described above until information on all of the commodities is obtained, the information on each of the commodities can be obtained. For example, when information on an extracted area includes characters "TOTAL AMOUNT", it is determined that obtaining information on all of the commodities is finished. It should be noted that a method for obtaining the information of each of the commodities are not limited to this. Another method using a description rule (for example, numbers are given to the commodities in order) and a description structure of the receipt may be used.

When the information on the purchased commodities is extracted from the receipt, based on character recognition, information on article codes (or commodity names as long as it is information for specifying the commodities) of the purchased commodities, unit prices of the purchased commodities, and the purchased numbers of the commodities can be recognized and information on the commodities can be obtained. In this way, information on the purchase store, the purchase date and time, the purchase commodities, and the prices in the receipt of one sheet can be obtained. In a case in which images of a plurality of receipts are included in the obtained image, the above described obtaining of the information on the commodities is performed for the respective images of the plurality of receipts.

When the information on the commodities is obtained from the image of the receipt, it is determined whether the name of the store obtained from the image of the receipt is the name of the store 1 (own-store) registered in the store/tax office information storage unit 326. In a case in which it is not the registered store, because the receipt is an improper receipt (receipt not subject to the tax exemption in this store), the purchased commodities described in the receipt are excluded from the application for the tax exemption and information to that effect is reported. That is, the information on the commodities obtained from the improper receipt is not used, in the subsequent processes, as a subject of the application for the tax exemption. It should be noted that in a case in which a plurality of stores are registered in the store/tax office information storage unit 326 and images of a plurality of receipts are obtained, in addition to determination whether it is a registered store, the respective receipts are classified for the stores. This is because a condition for applying for the tax exemption relates to a purchase amount (price) in one store.

Next, in a case in which a plurality of receipts of the same store registered in the store/tax office information storage unit 326 are present in the obtained images of the receipts, based on purchase dates of the receipts, the respective receipts are classified for the purchase dates. Then, the plurality of receipts are calculated (summed) for the respective purchase dates. This is because the condition for applying for the tax exemption relates to a purchase amount (price) in one day.

When it is confirmed from the receipts that the commodities are purchased in the stores registered in the store/tax office information storage unit 326, and the receipts are classified for one day in one store, article codes of the purchased commodities are obtained from the classified receipts. Then, based on the article information/article code storage unit 324, from article information items corresponding to article codes of the respective purchased commodities, it is determined (discriminated) whether the respective purchased commodities are commodities subject to the tax exemption. Further, in a case in which the purchased commodity is a commodity that is subject to the tax exemption, it is determined (discriminated) whether the classification of the purchased commodity is a general commodity or a consumable commodity.

It should be noted that when issuing the receipt, the POS register 2 may describe, for each of the purchased commodities, identification information that represents whether a purchased commodity is a general commodity or a consumable commodity as the commodity information on the corresponding commodity on the receipt. In this case, the identification information is obtained from the commodity information on each commodity obtained from the image of the receipt. Then, based on the identification information, whether the commodity is a general commodity, a consumable commodity or not subject to the tax exemption can be determined (discriminated) for each of the purchased commodities. For example, in the issued receipt, for each of the general commodities, a "o" mark may be described beside an article code, and for each of the consumable commodities, a "Δ" mark may be described beside an article code.

After the determination for all of the classified receipts is completed, for one day in one store, prices of the respective purchased general commodities that are subject to the tax exemption are summed and prices of the respective purchased consumable commodities that are subject to the tax exemption are summed. Then, the respective total prices (amounts) are calculated. In this way, from the obtained image(s) of the receipt(s), calculation results of the total price of the general commodities that are subject to the tax exemption and the total price of the consumable commodities that are subject to the tax exemption can be obtained for one day in one store.

It should be noted that in a case in which the information on the purchase commodities can be obtained from the POS register 2, extraction from the image of the receipt is unnecessary. Further, in a case in which the store clerk inputs the receipt number and the information is obtained from the POS register 2, when the receipt handed from the purchaser is improper, the POS register 2 may report an error without transmitting the information on the purchase commodities of the receipt. The improper receipt may be a receipt for commodities purchased in another store, for example. The MFP 3 or the tablet 4 can obtain the information on the purchase store, the purchase date and time, the purchase commodities, and the prices from the issued receipt of one sheet by extraction from the image of the receipt or obtaining information from the POS register 2.

Further, when it is determined whether the commodities are subject to the tax exemption to create the documents for the tax exemption, a total amount of the general commodities and a total amount of the consumable commodities are important. Thus, these information items may be input from a control panel of the MFP 3 or a screen of the tablet 4. This function for the input can be provided by the data input/revision unit 306 (FIG. 7). In this case, it is unnecessary to obtain the image of the receipt or to obtain the information from the POS register 2. Further, as described below, in a case in which predetermined information is obtained from a code described in the passport, information (such as a status of residence and a date of landing) not included in the code may also be input when the purchase total amount is input.

Figure 11A:
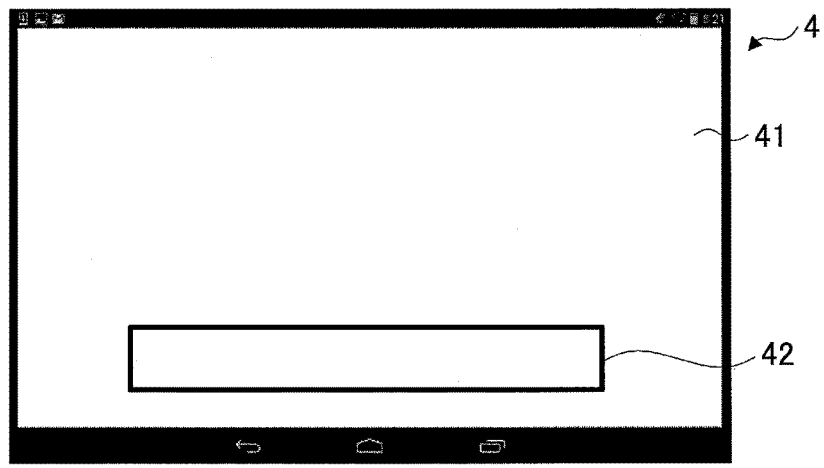
FIGS. 11A and 11B are drawings illustrating an example in which the tablet is used to obtain information of the passport (part 1)
Figure 11B:

In the above described processes, a case is described in which the images of the passport and the receipt are obtained in step S105 and S106 and the described contents of the passport and the receipt are recognized from the obtained images in step S107. Further, it is described that the obtaining of the image of the receipt and the recognition of the described contents of the receipt are unnecessary in a case in which the information can be obtained from the POS register 2 or the information can be input from the control panel of the MFP 3 or the screen of the tablet 4. In the following, an example will be described in which the tablet 4 (image obtaining apparatus) is used to recognize the code of the passport and other information is input manually. FIGS. 11A and 11B are drawings illustrating an example in which the tablet 4 is used to obtain information of the passport (part 1).

(Example in which the Image of the Passport is Obtained Immediately after the Recognition of the Code)

When an icon of a dedicated application is tapped from a desktop screen on the monitor of the tablet 4, the dedicated application is started and the camera function of the image obtaining unit 302 (FIG. 7) is started. In this case, as illustrated in FIG. 11A, in the monitor 41 of the tablet 4, an image photographed by the camera is displayed (illustration is omitted) and a reading frame 42 for reading the code is displayed in a lower side of the screen. It should be noted that a position and a size of the reading frame 42 correspond to a position of the code described in a lower side of a page (a page in which a face photograph is posted when the passport is opened) of identification matters of the passport. Accordingly, when the position of the code is different, the position of the reading frame 42 is changed. In the code, information on main items (including a passport type, an issuing county, a passport No., a name, a nationality, a date of birth, a sex, and a date of expiry) in the passport is embedded. Further, the reading frame 42 is arranged at a position where the entirety of the page including the code fits within the monitor (field of camera view) when the entirety of the code of the passport fits in the reading frame 42.

When the camera is directed to the identification matters page of the passport in this state such that the entirety of the code fits within the reading frame 42, an OCR function by the area/character recognition unit 303 (FIG. 7) acts to attempt to decode (read) the code. FIG. 11B illustrates a state in which the entirety of the code of the passport fits in the reading frame 42. As described above, when the entirety of the code of the passport fits within the reading frame 42, the entirety of the page including the code fits in the monitor (angle of camera view). When the code can be normally decoded by the OCR function, the image obtaining unit 302 (FIG. 7) actuates (starts) a shutter to obtain the image of the passport being photographed at the point of time, and stores the obtained image in the obtained image storage unit 321 (FIG. 7).

Figure 12:
FIG. 12 is a diagram illustrating an example in which the tablet is used to obtain the information of the passport (part 2)

Next, the data input/revision unit 306 (FIG. 7) displays an input screen for inputting items necessary for creating the documents for the tax exemption. When the input screen is displayed, information obtained from the code of the passport by the OCR function is set in advance. FIG. 12 is a diagram illustrating an example in which the tablet 4 is used to obtain information of the passport (part 2). FIG. 12 illustrates an example (part) of the input screen. As illustrated in FIG. 12, the items (such as credentials, a date of landing, a total price of the general commodities, and a total price of the consumable commodities) other than the information obtained by the OCR function can be input.

Further, although the code in the reading frame 42 is automatically recognized in the above description, the present disclosure is not limited to this. For example, a shutter button may be provided and the OCR function may be actuated when the shutter button is pushed by an operator.

Moreover, the actuation of the shutter and the transition to the input screen do not have to be performed when the code is only recognized by the OCR function. In this case, the actuation of the shutter and the transition to the input screen may be performed when the OCR function recognizes the code and it is confirmed that the identification matters page fits in a visual field of the camera with a size keeping predetermined image quality. As described above, according to the embodiment, the recognition of the code of the passport and the image acquisition of the identification matters page for a duty to store the image of the passport can be simultaneously performed in single image acquisition of the passport. Thus, it is not required to separately obtaining the image of the passport. Further, forgetting to obtain the image of the passport can be prevented. In this way, in a case in which there is a duty to store the image of the passport and the identification matters page is to be printed later, a retake of the image of the passport due to an insufficient take of the image of the passport can be certainly prevented It should be noted that the confirmation that the image fits in the visual field of the camera with the size keeping the predetermined image quality can be performed, simply, by determining whether a photograph part is fitted and/or determining whether right and left end parts of the passport and an upper end part of the passport are fitted.

(Example in which the Image of the Passport is Obtained Only in a Case in which there is a Duty of Storage)

When the icon of the dedicated application is tapped from the desktop screen on the monitor of the tablet 4, the dedicated application is started. Then, the input screen for inputting the credentials, the date of landing, the total price of the general commodities, and the total price of the consumable commodities is displayed by the function of the data input/revision unit 306 (FIG. 7).

Figure 13A:
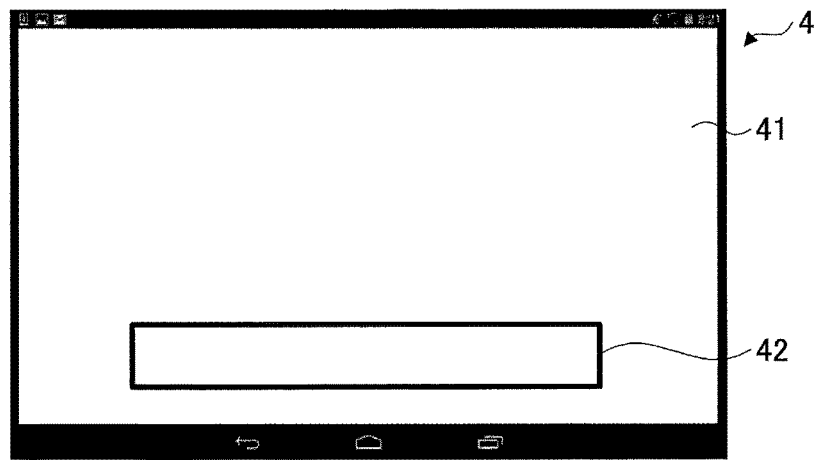
FIGS. 13A and 13B are diagrams illustrating an example in which the tablet is used to obtain the information from the passport (part 3)
Figure 13B:
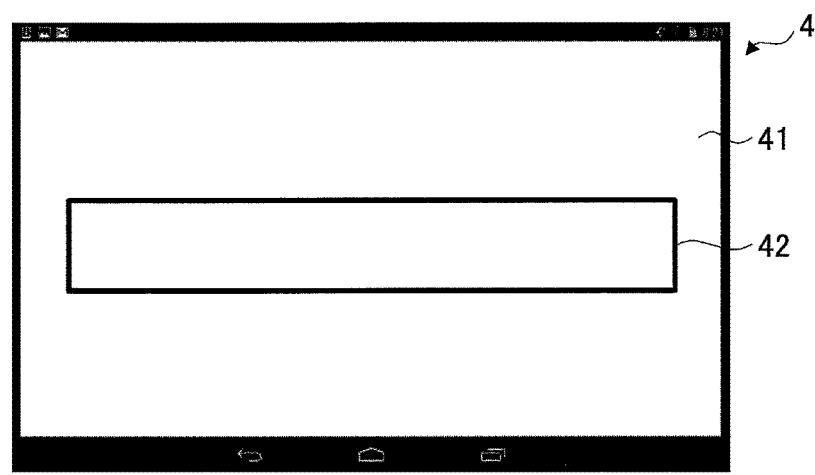

FIGS. 13A and 13B are diagrams illustrating an example in which the tablet 4 is used to obtain information from the passport (part 3). When the input of the predetermined items is completed, as illustrated in FIG. 13A, in the monitor 41 of the tablet 4, the image photographed by the camera is displayed (illustration is omitted) and the reading frame 42 is displayed in the lower side of the screen in a case in which there is a duty to store the image (image of the identification matters page) of the passport. For example, under current laws of Japan, in a case in which a total price of the general commodities exceeds 1 million Japanese yen, there is a duty to store the image of the passport. However, this is just an example, and a total price may be determined according to laws of other countries. It should be noted that the position and the size of the reading frame 42 correspond to the position and the size of the code described in the lower side of the page of the identification matters of the passport. Accordingly, when the position of the code is different, the position of the reading frame 42 is changed. Further, the reading frame 42 is arranged at the position where the entirety of the page including the code fits within the monitor (field of camera view) when the entirety of the code of the passport fits in the reading frame 42.

When the camera is directed to the identification matters page of the passport in this state such that the entirety of the code fits within the reading frame 42, the OCR function by the area/character recognition unit 303 (FIG. 7) acts to attempt to decode (read) the code. When the code can be normally decoded by the OCR function, the image obtaining unit 302 (FIG. 7) actuates the shutter to obtain the image of the passport being photographed at the point of time, and stores the obtained image in the obtained image storage unit 321 (FIG. 7).

On the other hand, after the input of the predetermined items is completed, as illustrated in FIG. 13B, in the monitor 41 of the tablet 4, the image photographed by the camera is displayed (illustration is omitted) and the reading frame 42 is displayed in a center of the screen in a case in which there is no duty to store the image (image of the identification matters page) of the passport. For example, under the current laws of Japan, in a case in which a total price of the general commodities does not exceed 1 million Japanese yen, there is no duty to store the image of the passport. However, this is just an example, and a total price may be determined according to laws of other countries. It should be noted that the position and the size of the reading frame 42 may be set arbitrarily. By arranging the large reading frame 42 in the center of the monitor 41, operability when the code of the passport is read can be improved. That is, when the reading frame 42 is positioned at the lower side of the screen, it may be difficult for the operator to fit the code of the passport in the reading frame 42. On the other hand, when the reading frame 42 is positioned at the center of the screen, it becomes easy to adjust the position. Further, when the reading frame 42 is positioned at the center of the screen, it becomes easy to understand that only the code should be fitted in the camera. Thus, anxiety of the purchaser that the face photograph may be captured (photographed) can be eliminated.

When the camera is directed to the identification matters page of the passport in this state such that the entirety of the code fits within the reading frame 42, the OCR function by the area/character recognition unit 303 (FIG. 7) acts to attempt to decode (read) the code. When the code can be normally decoded by the OCR function, the image obtaining unit 302 (FIG. 7) and the area/character recognition unit 303 (FIG. 7) end the process.

Referring back to FIG. 9, in step S108, based on the described contents recognized by the area/character recognition unit 303, the passport authenticity determination unit 304 determines whether the passport is genuine and valid with reference to the rule information of the passport/rule information storage unit 322 and the blacklist storage unit 323. In a case in which the passport authenticity determination unit 304 determines that the passport is not genuine and valid, an alert to that effect is made and the subsequent processes are stopped.

In a case in which the passport authenticity determination unit 304 determines that the passport is genuine and valid, after inputting the described contents of items extracted from the image of the passport among the information items necessary for the application for the tax exemption, the data input/revision unit 306 displays a screen in which information for the application for the tax exemption can be input and revised. At this time, input items, which are information items other than the information items extracted from the image of the passport, to be input by the purchaser for the application for the tax exemption are included in the screen. Further, item names of the extracted information items and item names of the input items are described (displayed) in Japanese language as a default (a vernacular language of a country in which a store is located or a language primarily used in the country) and in a language (native language) corresponding to the country (nationality) specified from the image of the passport based on correspondence information of nationalities and working languages registered in the document format storage unit 329. In this way, the item names can be displayed both in the language (here, Japanese language) preferable for the store clerk and in the language preferable for the purchaser.

The purchaser operates the screen and/or an input device such as a keyboard to input a status of residence, a date of landing and the like, which are information items that cannot be obtained (have not be obtained) from the image of the passport. The data input/revision unit 306 receives the input, reflects (updates) the input contents in the screen, and displays the updated screen. Further, the store clerk confirms whether the described contents of the passport and the receipt, automatically recognized by the area/character recognition unit 303 are correct via the screen. If revision is required, the described contents and processing information based on them are revised. The data input/revision unit 306 receives the input revised contents to update the screen in which the revision is reflected in step S109.

Figure 14A:
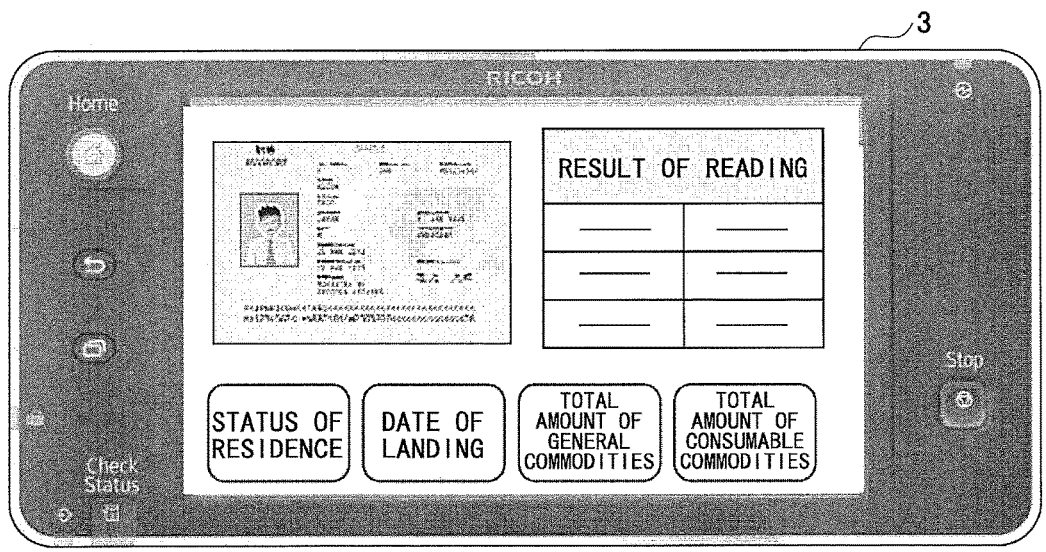
FIGS. 14A to 14D are diagrams illustrating examples of screens for inputting and revising data.
Figure 14B:
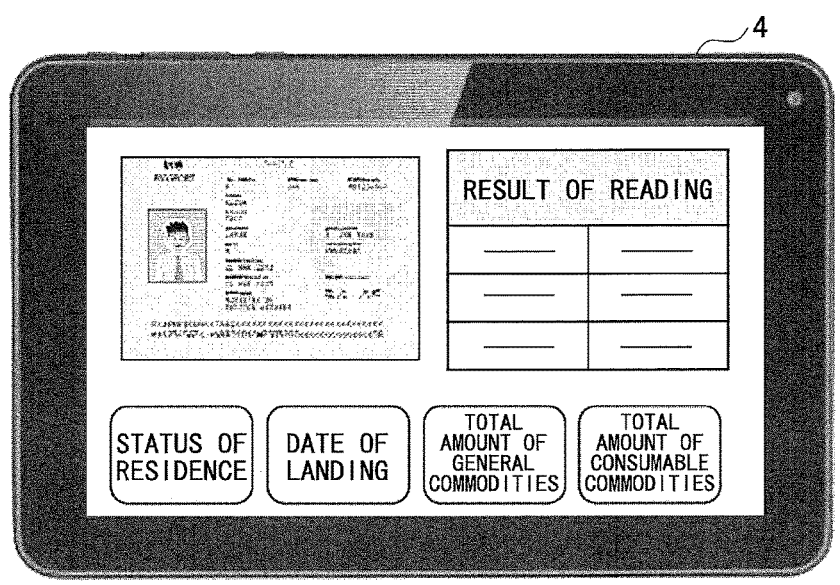
Figure 14C:
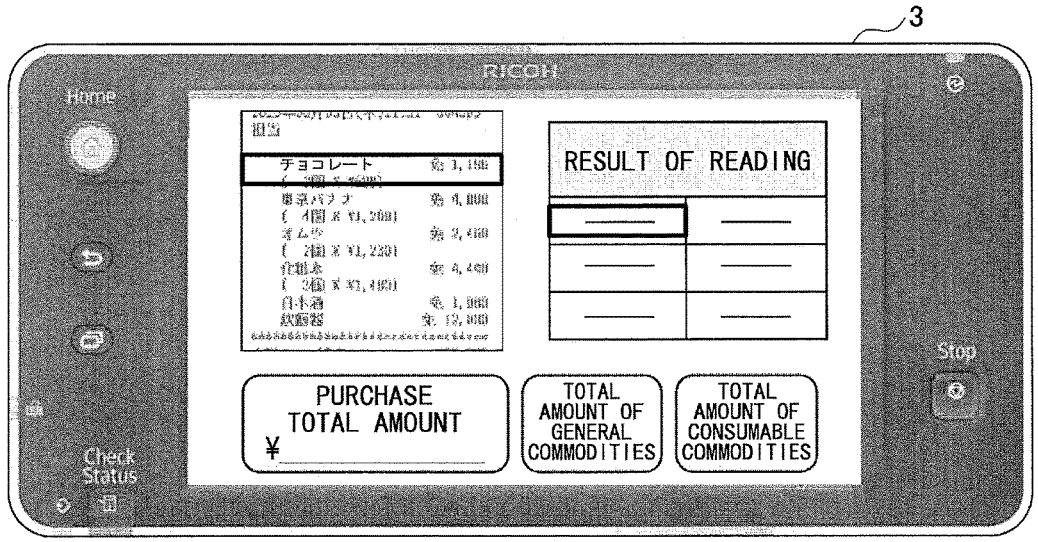
Figure 14D:
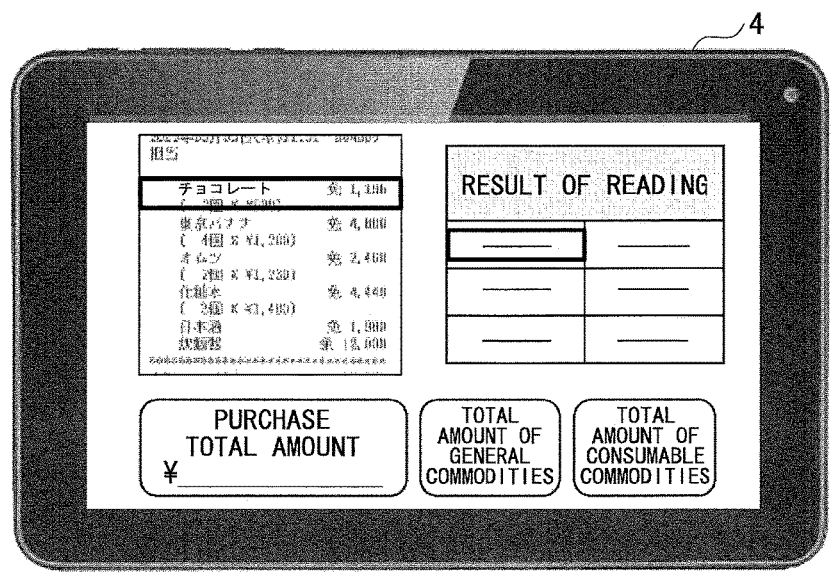

FIGS. 14A to 14D are diagrams illustrating examples of the screens for inputting and revising data. In FIG. 14A, the image of the passport and the recognition result (result of reading) are displayed in the MFP 3, and input of a status or residence (when tapped, options of "temporary visitor", "college student", "entertainer", "cultural activities" and the like are displayed and selectable), input of a date of landing, revise of a total amount of the general commodities and a total amount of the consumable commodities can be performed. FIG. 14B illustrates a screen in the tablet 4 similar to the screen in the MFP 3. In FIG. 14C, the image of the receipt and the recognition result (result of reading) are displayed in the MFP 3, and the total amount of the general commodities, and the total amount of the consumable commodities, and a purchase total amount can be revised. FIG. 14D illustrates a screen in the tablet 4 similar to the screen in the MFP 3.

Referring back to FIG. 9, when the input and the revise of the information are completed via the screen, and an instruction to confirm the completion is made by the purchaser or the store clerk (for example, a "completion" button is pushed), the tax exemption object determination unit 307 determines in step S110, for the general commodities and the consumable commodities, one or more commodities that are subject to the tax exemption with reference to the tax exemption condition storage unit 325. Specifically, the tax exemption object determination unit 307 determines whether a total amount of the general commodities, purchased for a single day in the same store, that are subject to the tax exemption satisfies the applicable condition for the application for the tax exemption. Specifically, the tax exemption object determination unit 307 determines whether the total amount of the general commodities exceeds 10,000 Japanese yen. Similarly, the tax exemption object determination unit 307 determines whether a total amount of the consumable commodities, purchased for a single day in the same store, that are subject to the tax exemption satisfies the applicable condition for the application for the tax exemption. Specifically, the tax exemption object determination unit 307 determines whether the total amount of the consumable commodities exceeds 5,000 Japanese yen. If it is determined that the total amount of the general commodities and/or the total amount of the consumable commodities exceeds the corresponding amount (predetermined price), the applicable condition for applying for the tax exemption can be satisfied.

Next, in a case in which the total amount of the consumable commodities exceeds 5,000 Japanese yen, the tax exemption object determination unit 307 determines whether the total amount of the consumable commodities exceeds 500,000 Japanese yen. Because there is an upper limit amount (price) for the application for the tax exemption for the consumable commodities, an excess part exceeding 500,000 Japanese yen is subject to taxation.

It should be noted that at this time, based on the processed data storage unit 331, it is determined whether the same purchaser has already applied for the tax exemption for consumable commodities purchased in the same day at the store 1. Specifically, by searching the processed data storage unit 331 using the purchaser (name obtained from the passport) and the date of purchase described in the receipt of the tax exemption application objects as keys, it is determined whether pertinent processed data is present.

In a case in which the pertinent processed data is present, a total amount of consumable commodities for which the tax exemption has been applied from the pertinent processed data is obtained, and the obtained total amount is added (summed) to the total amount of the consumable commodities for which the tax exemption is applied this time. In other words, the past total amount is added to the total amount this time (current total amount). In a case in which a plurality of pieces of pertinent processed data for the tax exemption application are present, a total amount obtained from each of the plurality of pieces of the pertinent processed data is added to the total amount of the consumable commodities for which the tax exemption is applied this time. Then, it is determined whether the total amount after being added (summed) exceeds 500,000 Japanese yen.

For example, even when consumable commodities have been purchased for a plurality of times separately and tax exemptions have been applied for a plurality of times separately, if the total amount exceeds 500,000 Japanese yen, an amount of the excess part is subject to taxation. In this way, a surcharge to be charged at a later date from a tax office to the tax free store can be prevented.

If the tax exemption object determination unit 307 determines that the total amount of the consumable commodities exceeds 500,000 Japanese yen, information to that effect is reported to the store clerk or the purchaser. At this time, a selection screen for selecting commodities to be excluded from the objects of the application for the tax exemption is displayed, and the purchaser may select commodities to be excluded from the objects of the application for the tax exemption.

For example, a list of the consumable commodities that are subject to the tax exemption and the total amount are displayed in the tablet 4, and the purchaser selects one or more commodities to be excluded from the objects. When the commodities are selected, a total amount in which prices of the selected commodities are subtracted is displayed in the screen. Then, in a case in which the updated (subtracted) total amount becomes equal to or less than 500,000 Japanese yen, the purchaser can instruct to decide commodities for the tax exemption application via the screen. For example, the screen is controlled such that when a total amount exceeds 500,000 Japanese yen, a "decide button" is displayed in non-selectable manner, and when a total amount becomes equal to or less than 500,000 Japanese yen, a "decide button" is displayed in a selectable manner. In this way, based on the receipt of the commodities purchased by the purchaser, the general commodities and the consumable commodities that are subject to the tax exemption can be determined.

Further, under the current system in Japan, in a case in which a total purchase price of the general commodities for a single day exceeds 1 million Japanese yen, there is a duty to store a copy of the passport. Thus, it is determined whether the duty is present based on the processed data storage unit 331 similarly. That is, it is retrieved (determined) whether a tax exemption application applied by the same purchaser in the same day in the same store is present in tax exemption applications that have been already applied (in other words, other tax exemption applications made by the same person are retrieved from the tax exemption applications that have been applied in the same store on the same day). If the application present, a total amount of general commodities for which the tax exemption has been applied is added (summed) to the total amount of the general commodities for which the tax exemption is applied this time. Then, it is determined whether the total amount after being added (summed) exceeds 1 million Japanese yen.

In this way, for example, in a case in which a total amount of general commodities purchased in the morning in some day is 800,000 Japanese yen, it is determined at that time that there is no duty to store a copy of the passport. However, in a case in which general commodities are purchased for 300,000 Japanese yen in the afternoon of the day, it is determined that there is a duty to store a copy of the passport because the total amount (1,000,000 Japanese yen) exceeds 1 million Japanese yen. In this way, a human error of forgetting to store a copy of the passport can be prevented.

Next, in step S111, the quarantine information provision unit 308 provides, with reference to the quarantine information storage unit 327, quarantine information (whether quarantine measures are required, whether it is prohibited to take back the commodity as hand baggage or to take back the commodity by courier and substitute commodities) depending on the purchase commodities and the home country to which the purchaser takes the commodities back. Because information on the country has been specified by using the described contents of the nationality extracted from the passport, the quarantine information provision unit 308 can refer to the quarantine information storage unit 327 in accordance with the specified country and provide the information in accordance with the country of the purchaser (applicant).

Next, in step S112, based on a determination result by the tax exemption object determination unit 307, the information on one or more commodities (both the general commodities and the consumable commodities) that are subject to the application for the tax exemption in this time, information obtained from the passport, input/revised information, and information registered in the store/tax office information storage unit 326, the document creation unit 309 creates data of the documents for the tax-exempt sale (a record of purchase, a covenant of a purchaser and a list of consumable commodities) with reference to the document format storage unit 329. Here, a document format of a language corresponding to the nationality specified from the passport is used in at least part of the documents for the tax-exempt sale to be created. For example, in the covenant (purchaser's agreement) of the purchaser in which the purchaser signs the purchaser's name to make a pledge, it is preferable to use the language, corresponding to the nationality of the passport, for contents of pledge and contents that describe caution, because it is preferable that these contents are described in the language readable by the purchaser.

Next, in step S113, based on the nationality, the sex, the names of the purchased commodities, the purchase amount and the like, the advertisement creation unit 310 creates data of an advertisement document with reference to the advertisement information storage unit 328. The advertisement document is created in the language corresponding to the nationality. It is preferable to create and describe the advertisement document using both the language corresponding to the nationality and English language.

Figure 15:
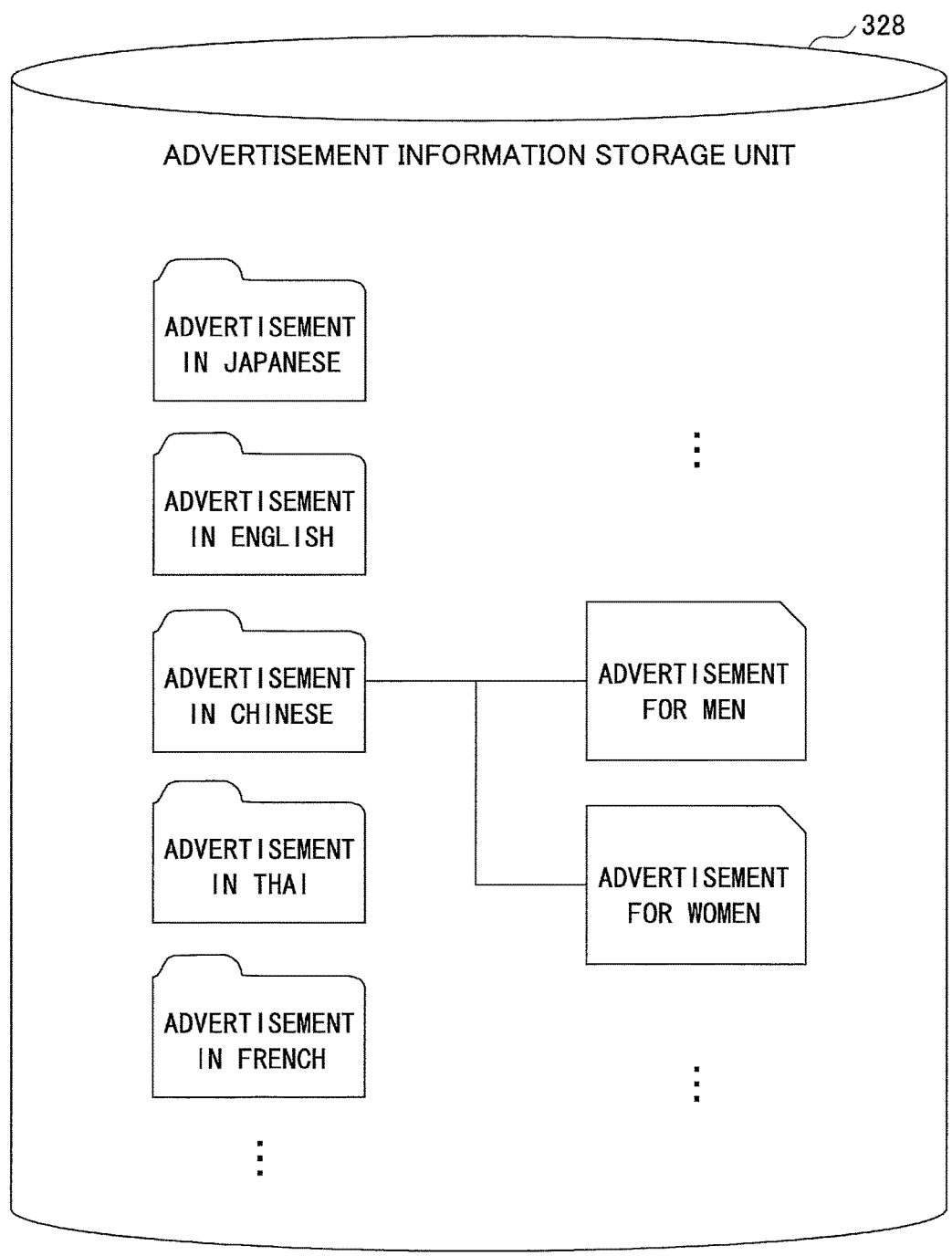
FIG. 15 is a diagram illustrating an example of an advertisement information storage unit.

FIG. 15 is a diagram illustrating an example of the advertisement information storage unit 328. As illustrated in FIG. 15, in the advertisement information storage unit 328, advertisement information is registered in a folder provided for each language (Japanese language, English language, Chinese language, Thai language, French language, and the like). Further, files such as "ADVERTISEMENT FOR MEN" and "ADVERTISEMENT FOR WOMEN" are registered in each folder.

Then, an appropriate folder is specified based on the country information obtained from the passport information. For example, if the nationality is Chinese, the folder "ADVERTISEMENT IN CHINESE LANGUAGE" is specified. Moreover, a file is specified based on the sex information obtained from the passport information, and the advertisement information is obtained from the specified file. For example, "ADVERTISEMENT FOR MEN" is obtained for a man. It should be noted that the advertisement information may be embedded in a vacant space (for example, an area, among four divided areas of a sheet, on which nothing is printed) when the documents for the tax exemption are printed. However, in a case in which it is imperative to print the advertisement information, at least one of the documents for the tax exemption is divided to (printed on) another sheet to make the vacant space, or the advertisement information is printed on another sheet. The advertisement information may include a coupon and the like. Further, the advertisement information is not limited to typical characters/images for people. The advertisement information may include two-dimensional code in which a URL link is embedded.

Figure 16:
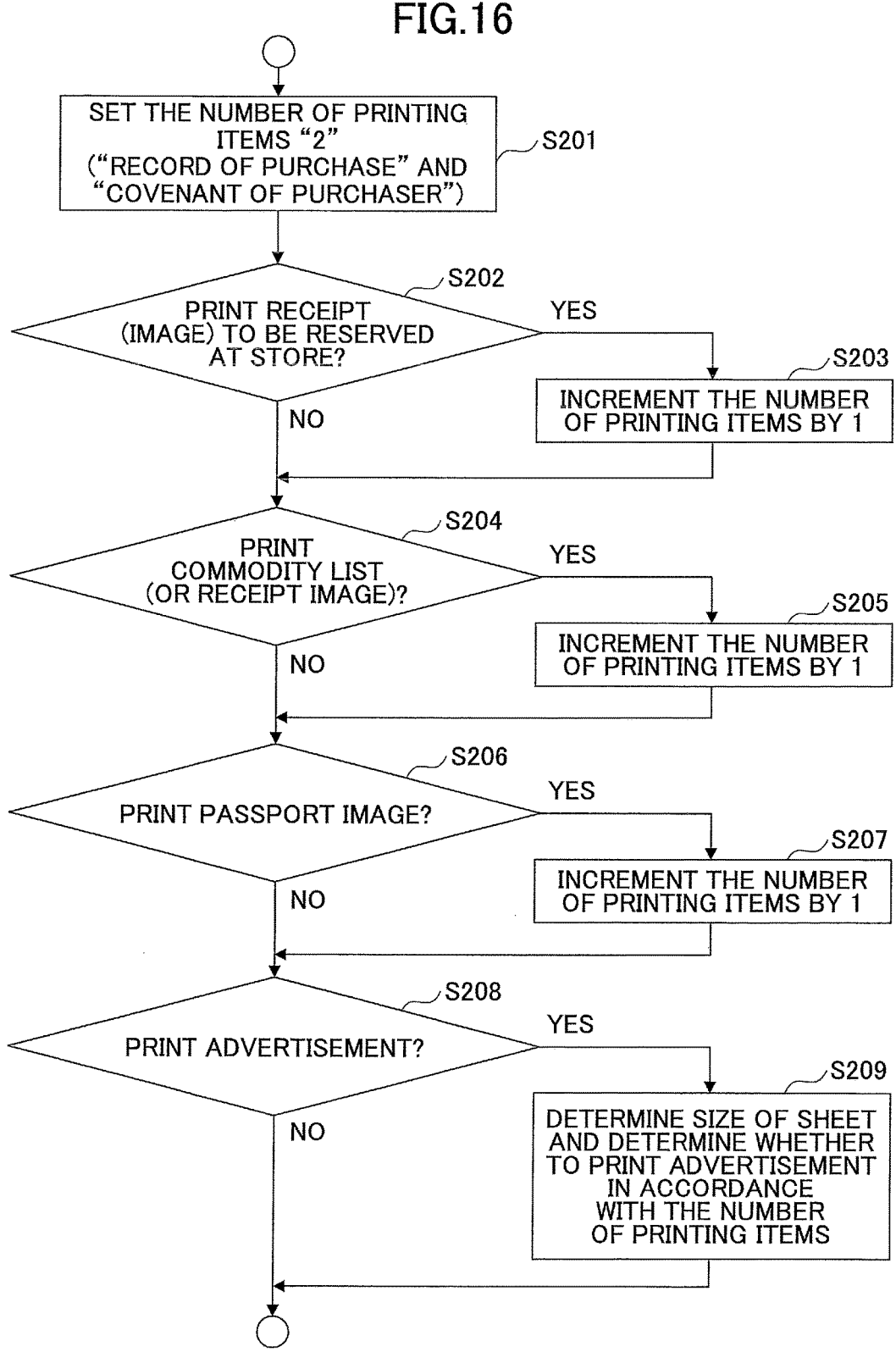
FIG. 16 is a flowchart illustrating a process example in which an advertisement is inserted in a vacant space.

FIG. 16 is a flowchart illustrating a process example in which the advertisement is inserted in the vacant space. The process mainly relates to the advertisement creation unit 310 (FIG. 7). As illustrated in FIG. 16, in step S201, the advertisement creation unit 310 sets the number of printing items "2" corresponding to "RECORD OF PURCHASE" and "COVENANT OF PURCHASER" as an initial value.

Next, in step S202, the advertisement creation unit 310 determines whether to print a receipt (image) to be reserved at the store (duplicate copy for the store). The determination (whether to print or not) in step S202 may be set by initial settings or may be made for each case. In a case in which the advertisement creation unit 310 determines to print the receipt (image) to be reserved at the store (Yes in step S202), the advertisement creation unit 310 increments the number of printing items by 1 in step S203.

After determining not to print the receipt (image) to be reserved at the store (No in step S202), or after incrementing the number of printing items by 1 in step S203, the advertisement creation unit 310 determines in step S204 whether to print a list of the commodities or a receipt image, which can serve as a substitute for the list of the commodities. The determination (whether to print or not) in step S204 may be set by the initial settings or may be determined case-by-case. In a case in which the advertisement creation unit 310 determines to print the list of commodities or the receipt image, which can serve as the substitute for the list of the commodities, (Yes in step S204), the advertisement creation unit 310 increments the number of printing items by 1 in step S205.

After determining not to print the list of commodities or the receipt image, which can serve as the substitute for the list of the commodities (No in step S204), or after incrementing the number of printing items by 1 in step S205, the advertisement creation unit 310 determines in step S206 whether to print the image of the passport. For example, in a case in which there is a duty to store the image of the passport because a total amount of the general commodities exceeds 1 million Japanese yen, the advertisement creation unit 310 determines to print the image of the passport. In a case in which the advertisement creation unit 310 determines to print the image of the passport (Yes in step S206), the advertisement creation unit 310 increments the number of printing items by 1 in step S207.

After determining not to print the image of the passport (No in step S206), or after incrementing the number of printing items by 1 in step S207, the advertisement creation unit 310 determines in step S208 whether to print advertisement. Whether to print the advertisement may be set by initial settings and the determination is made based on the settings. In a case in which the advertisement creation unit 310 determines not to print the advertisement (No in step S208), the process ends.

In a case in which the advertisement creation unit 310 determines to print the advertisement (Yes in step S208), the advertisement creation unit 310 determines in step S209 a size of a sheet and whether to print the advertisement in accordance with the number of printing items. Then, the process ends. That is, even if the advertisement creation unit 310 determines to print the advertisement in step S208, there may be a case that the advertisement is not to be printed depending on the number of printing items. FIG. 17 is an example of a table in which the number of printing items, a size of the sheet, and whether to print the advertisement are associated. In a case in which the number of printing items is an even number ("2" or "4"), the advertisement is not to be printed. In a case in which the number of printing items is an odd number ("3" or "5"), the advertisement is to be printed. It should be noted that although the size of the sheet and addition of an advertisement item are determined in accordance with the number of printing items, the number of advertisement items may be added in accordance with the number of vacant items (spaces) in a case in which the size of the sheet is fixed. For example, in a case in which the number of printing items before the advertisement is printed is "2" and the size of the sheet is fixed as A4 size (210 mm×297 mm), 2 items of the documents for the tax exemption and 2 items of advertisements can be printed on one A4 size sheet.

Although, the receipt image can be used for "COVENANT OF PURCHASER (receipt is attached to be reserved at the store)" and "LIST OF CONSUMABLE COMMODITIES (or receipt handled as a substitute)" of two kinds of documents, the receipt or the like output from the POS register 2 may be attached. Thus, in consideration of the number of receipts to be printed from the POS register 2, the number of receipts to be output from the system at the store may be selectable. It should be noted that other than the above described two kinds of the documents, "RECORD OF PURCHASE (receipt is attached for passport attachment)" may be handled as a determination object described above.

Further, by combining and printing documents in accordance with perforations, a layout of printing can be performed in order to satisfy the following conditions.

There is no perforation between the covenant of the purchaser and the receipt.

The advertisement can be cut independently.

The list of the consumable commodities can be cut independently.

The record of purchase can be cut independently (however, there is no perforation in a case in which a receipt for passport attachment is printed).

Figure 18A:
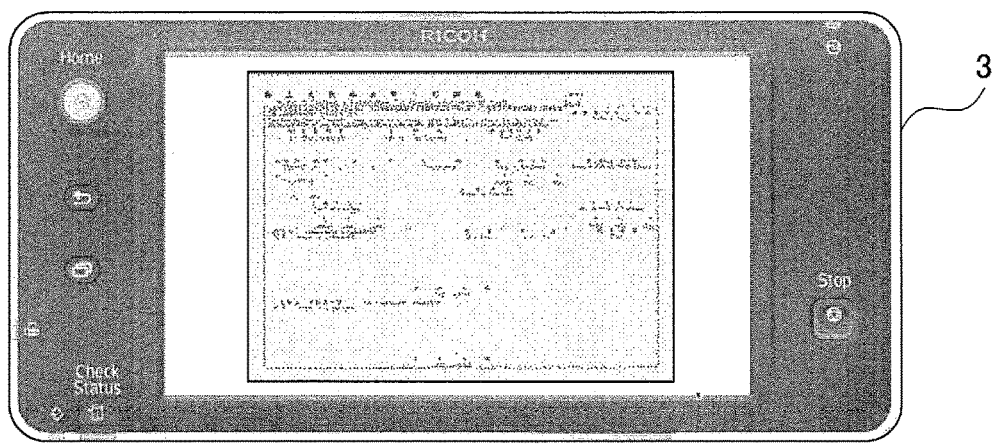
FIGS. 18A and 18B are diagrams illustrating examples of print preview images.
Figure 18B:
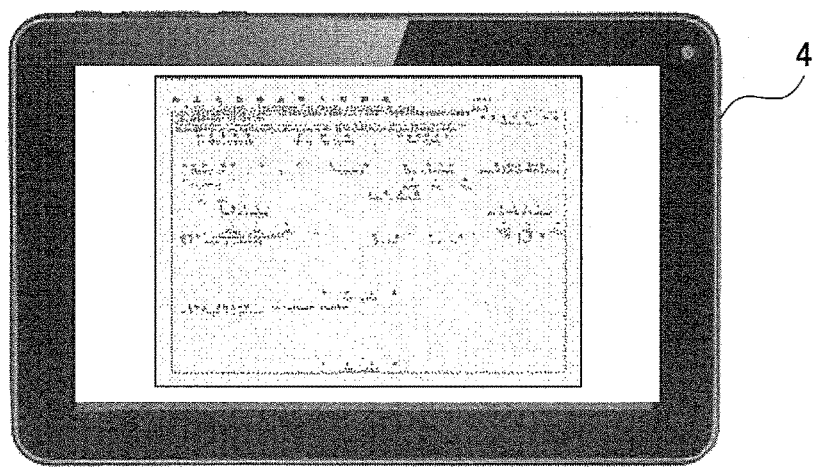

Referring back to FIG. 9, in step S114, the print processing unit 311 causes a printing apparatus, represented by an output destination set in the output destination information storage unit 330, to print the documents for the tax-exempt sale created by the document creation unit 309 and the advertisement document created by the advertisement creation unit 310. It should be noted that before printing is started, a print preview image as illustrated in FIG. 18 is displayed on the MFP 3 or the tablet 4. Then, when an instruction to start printing is received from the operator, printing is started.

Figure 19A:
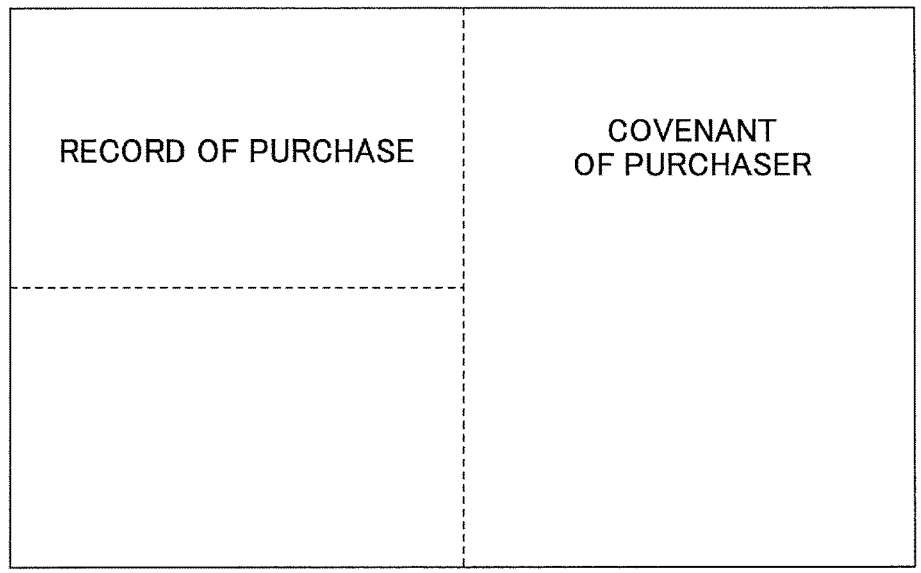
FIGS. 19A and 19B are diagrams illustrating examples of arrangements of documents for tax exemption on a sheet.
Figure 19B:
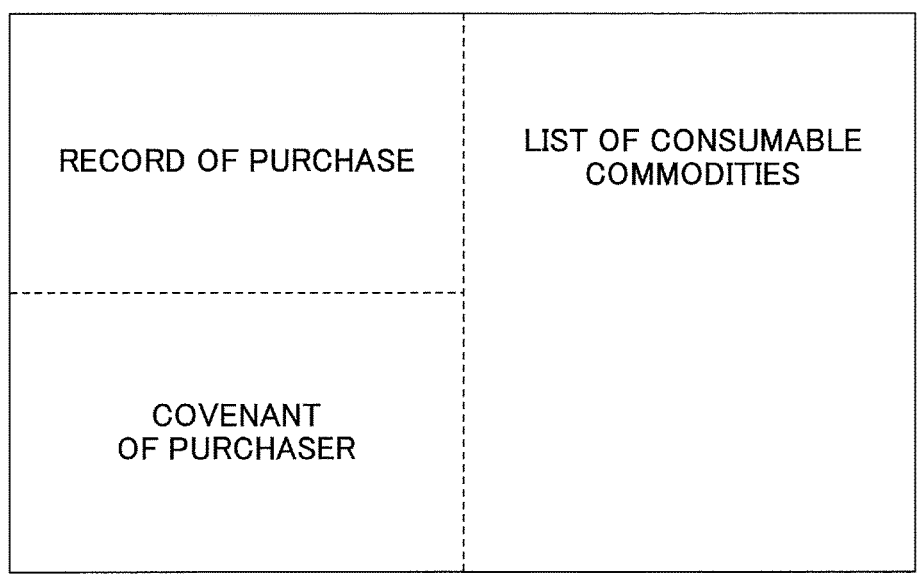

FIGS. 19A and 19B are diagrams illustrating examples of arrangement of the documents for the tax exemption on one sheet. In the examples illustrated in FIGS. 19A and 19B, a plurality of documents for the tax exemption are printed on one sheet, and the documents can be cut away. By using the sheet having perforations on a position illustrated by a broken line, cutting can be easily performed. The advertisement information may be printed on other sheets. FIG. 19A illustrates the documents for the general commodities. In FIG. 19A, the record of purchase and the covenant of the purchaser are arranged. FIG. 19B illustrates the documents for the consumable commodities. In FIG. 19B, the record of purchase, the covenant of the purchaser, and the list of the consumable commodities are arranged. The list of the consumable commodities may be omitted in a case in which a receipt is used as a substitute for the list of the consumable commodities. FIG. 20 is an example of the record of purchase. FIG. 21 is an example of the covenant of the purchaser. FIG. 22 is an example of the list of the consumable commodities. These documents include one or more items obliged by tax laws to be described.

The record of purchase is attached to the passport of the purchaser, and a tally impression is stamped. The covenant of the purchaser is stored at the store 1 after the name is signed. The list of the consumable commodities is attached to baggage packed in a transparent packing member such that contents can be observed from the outside, or is enclosed in the packing member such that the contents can be observed from the outside. It should be noted that in a case in which an amount (price) of tax exemption has not been deducted in the POS register 2, the amount of the tax exemption is refunded when the documents for the tax exemption are delivered.

Next, an example will be described in which a feeding cassette is appropriately selected to change a sheet in accordance with a layout of the documents when the MFP 3 performs printing and the documents are created and printed in steps S112 to S114 of FIG. 9.

Figure 23:
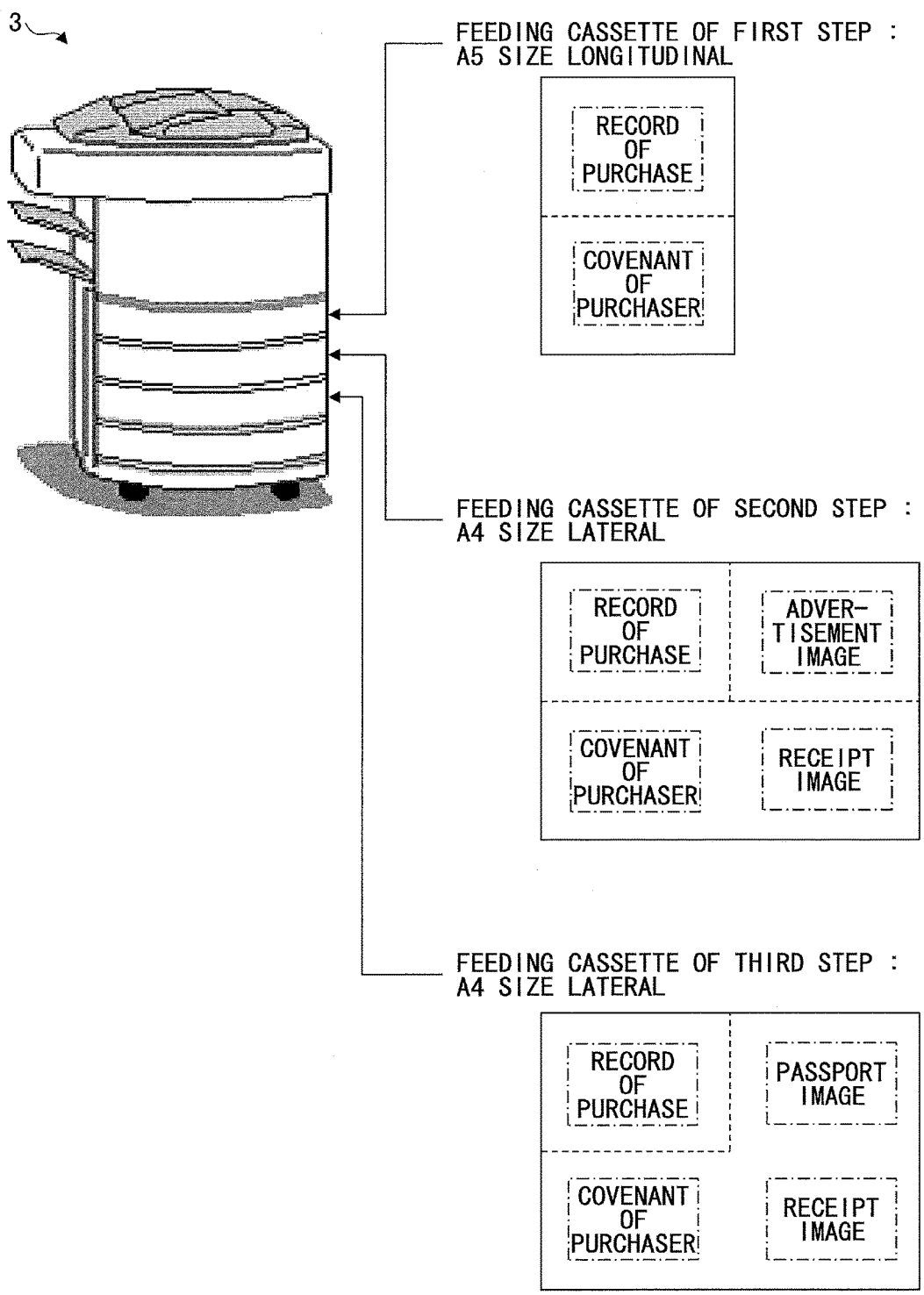
FIG. 23 is a diagram illustrating an example of the MFP including a plurality of feeding cassettes.

FIG. 23 is a diagram illustrating an example of the MFP 3 including a plurality of feeding cassettes. In the feeding cassettes, sheets having different sizes and different perforations are set. As illustrated in FIG. 23, in a feeding cassette of a first step of the MFP 3, sheets having A5 size (longitudinal) and having perforations illustrated by a broken line are set. In a feeding cassette of a second step, sheets having A4 size (lateral) and having perforations illustrated by a broken line are set. In a feeding cassette of a third step, sheets having A4 size (lateral) and having perforations illustrated by a broken line are set. It should be noted that a layout of the documents and perforations are not limited to the example illustrated in FIG. 23.

Figure 24:
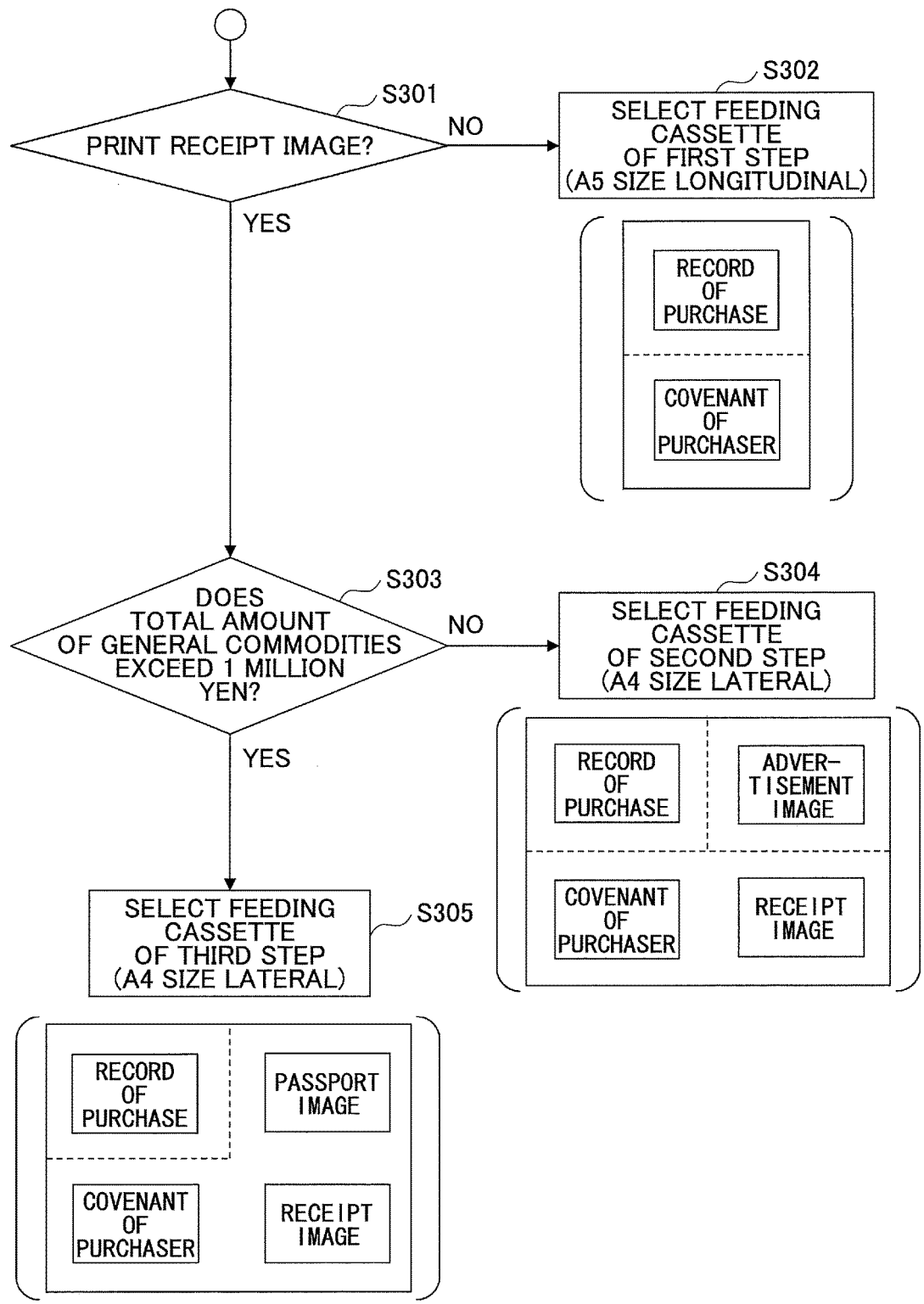
FIG. 24 is a flowchart illustrating a process example in which a feeding cassette is selected based on a layout of the documents.
Figure 25:
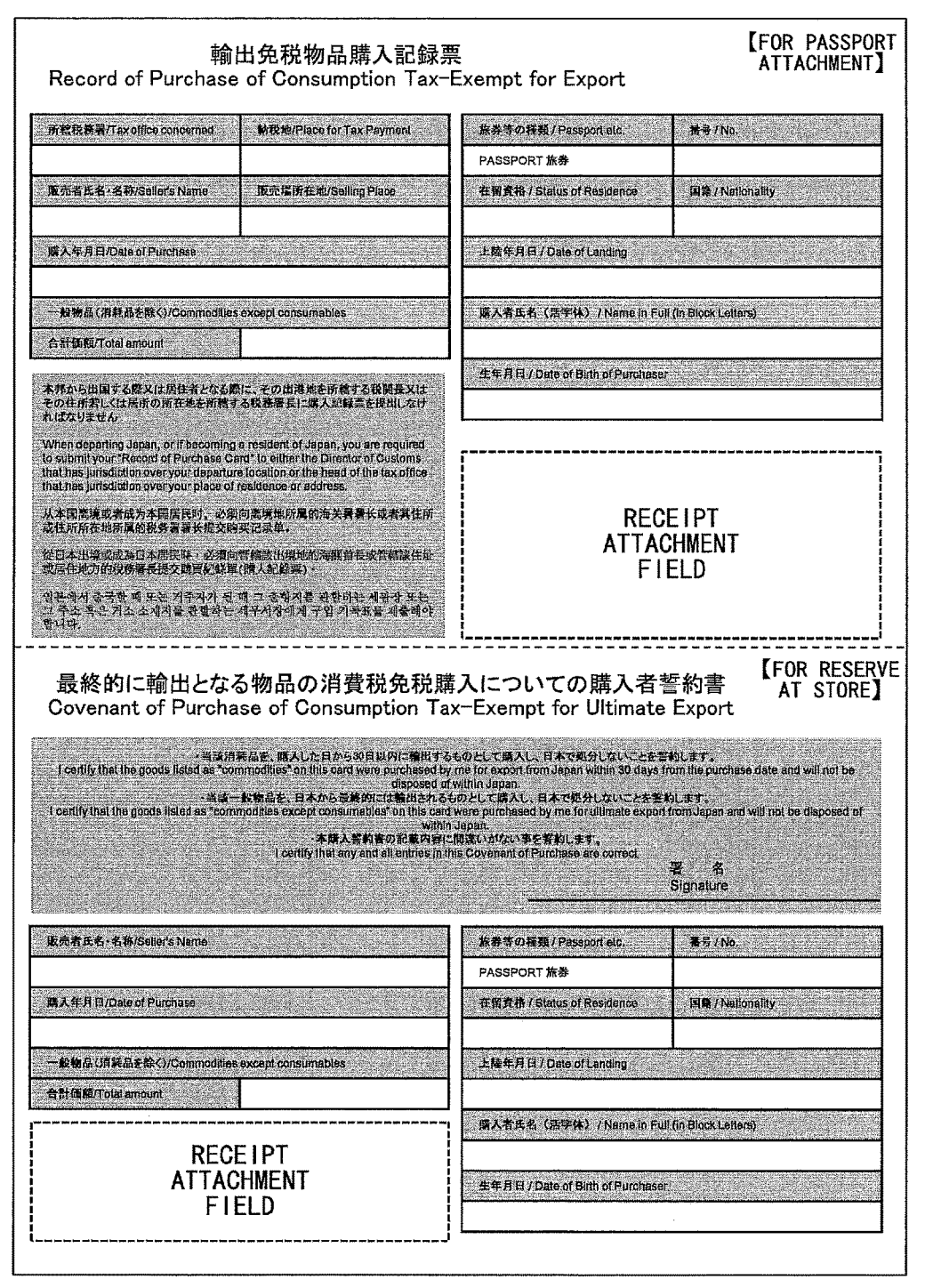
Figure 26:
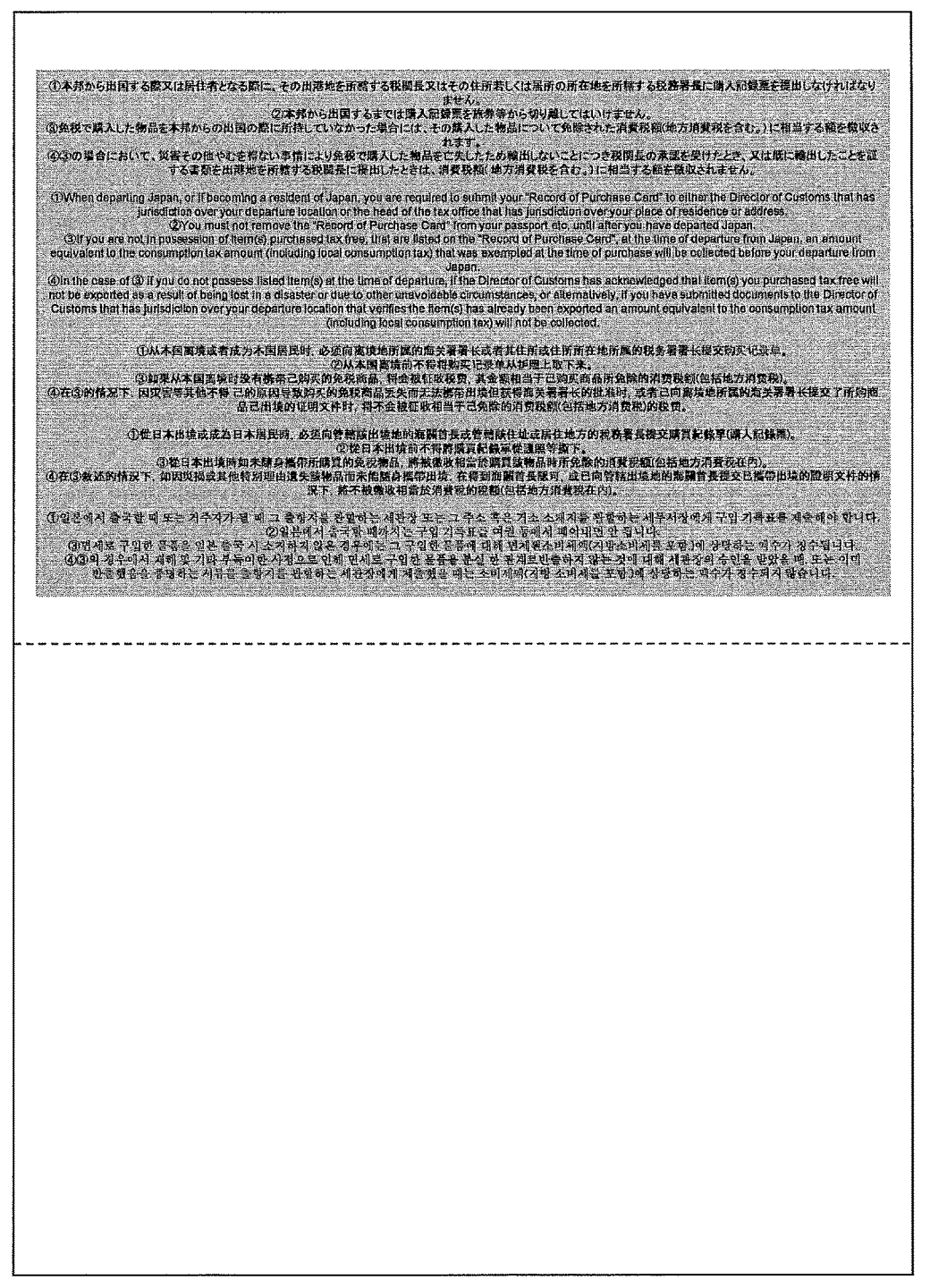

FIG. 24 is a flowchart illustrating a process example in which a feeding cassette is selected based on a layout of the documents. The process mainly relates to the print processing unit 311 (FIG. 7). As illustrated in FIG. 24, in step S301, the print processing unit 311 determines whether there is a receipt image to be printed. In a case in which the print processing unit 311 determines that there is no receipt image to be printed (No in step S301), the print processing unit 311 selects the feeding cassette of the first step (A5 size longitudinal), and performs the printing in step S302. In this case, the record of purchase (record of purchase of consumption tax-exempt for export) for passport attachment is printed on the upper half of the sheet segmented by the perforations, and a note of caution is printed on its back surface. Further, the covenant of the purchaser to be reserved at the store is printed on the lower half of the sheet. FIG. 25 is a drawing illustrating examples of the record of purchase and the covenant of the purchaser. FIG. 26 is a drawing illustrating an example of the note of caution printed on the back surface.

Referring back to FIG. 24, in a case in which the print processing unit 311 determines that there is the receipt image to be printed (Yes in step S301), the print processing unit 311 determines in step S303 whether a total amount (price) of the general commodities exceeds 1 million Japanese yen. That is, the print processing unit 311 determines whether there is a duty to store a copy of the passport. In a case in which the print processing unit 311 determines that there is no duty to store the copy of the passport (No in step S303), the print processing unit 311 selects the feeding cassette of the second step (A4 size lateral) and performs the printing in step S304. In this case, the record of purchase for the passport attachment is printed on a left side of the upper half of the sheet segmented by the perforations, the note of caution is printed on its back surface, and an advertisement image is printed on a right side of the upper half. Further, the covenant of the purchaser to be reserved at the store and the receipt image are printed on the lower half of the sheet. It should be noted that the advertisement information may be printed on a blank portion as described above.

In a case in which the print processing unit 311 determines that there is the duty to store the copy of the passport (Yes in step S303), the print processing unit 311 selects the feeding cassette of the third step (A4 size lateral) and performs the printing in step S305. In this case, the record of purchase for the passport attachment is printed on the left side of the upper half of the sheet segmented by perforations, and the note of caution is printed on its back surface. Further, the image of the passport is printed on the right side of the upper half, and the covenant of the purchaser to be reserved at the store and the receipt image are printed on the lower half of the sheet.

The documents for the tax exemption are basically configured with the record of purchase and the covenant of the purchaser. However, in a case in which the total amount of the general commodities exceeds 1 million Japanese yen, the copy of the passport is included in the documents for the tax exemption. As for the consumable commodities, the list of the consumable commodities or an alternative receipt or the like that can serve as a substitute for the list is included in the documents for the tax exemption. Further, a receipt attached to the record of purchase, or an alternative document that can serve as a substitute for that may be included in the documents for the tax exemption as appropriate.

Moreover, a receipt attached to the covenant of the purchaser or an alternative document that can serve as a substitute for that may be included in the documents for the tax exemption as appropriate. In a case in which the record of purchase and the covenant of the purchaser, which are the basic configuration, are printed, these two documents are printed on a sheet having a small size like the A5 size according to the above described processes.

In a case in which a copy of the passport (image of the passport), the list of the consumable commodities or the like is also printed, a sheet having a large size like the A4 size is used to perform the printing effectively, because when the sheets having the A5 size are used, the number of sheets to be used is increased and the documents may be scattered. It should be noted that the record of purchase, the covenant of the purchaser, and the copy of the passport may be reduced and printed on one sheet having the A5 size. However, it makes difficult to store the documents in the store, because the sizes of the documents may vary depending on a situation, even if the contents of the documents are the same. Accordingly, in order to store the documents in the same size, it is preferable to use the sheet having the A4 size, whose area is twice as large as the area of the sheet having the A5 size.

Further, in the documents for the tax exemption, although a part for passport attachment and a part to be reserved at the store are output on the same sheet, a workload for separating the documents can be reduced because perorations are formed on sheets (A4 size, A5 size) in advance.

Referring back to FIG. 9, in step S115, the data storage unit 312 stores, in the processed data storage unit 331, information on the printed documents for the tax exemption and the advertisement document, or information in the course of the processes. In a case in which the tax exemption object determination unit 307 determines that there is the duty to store the copy of the passport, a storage process for storing the obtained image of the passport is executed. As an example of the storage process, a process for causing the image of the passport to be included in data to be stored in the processed data storage unit 331, a process for transmitting the image of the passport to the management server 6 (then, the management server 6 stores the image of the passport), or a process for recording the image of the passport in a dedicated recording device may be executed. Further, for example, a process for printing the image of the passport when the documents for the tax exemption are printed may be executed. In a case in which the image of the passport is printed, the image of the passport may be included in the sheet illustrated in FIG. 19A, may be included in the covenant of the purchaser of the general commodities, or may be printed on another sheet. It should be noted that the image of the passport is stored associated with the covenant of the purchaser.

On the other hand, in a case in which the tax exemption object determination unit 307 determines that there is no duty to store the copy of the passport, the image of the passport (data of the obtained image) is discarded and not stored. Especially, because the passport has highly confidential information, it is preferable to delete the image of the passport from a storage unit such as a HDD and a memory, included in the apparatus that has obtained image of the passport, such that other people cannot easy to obtain the image of the passport. It should be noted that the data of the image of the passport (or the writing) can be discarded after the described contents (written contents) of the passport (or the writing) are recognized by the area/character recognition unit 303.

In step S116, the closing processing 313 causes the printing apparatus, represented by the output destination set in the output destination information storage unit 330, to print, in accordance with an operation of the store clerk at a closing time of a day or an arrival of a predetermined time, a list of tax exemption processing cases for the day. For example, the printing apparatus may output a transfer slip for tax exemption and a list of tax exemption amounts of passport numbers by using paper. It should be noted that information output by using the paper is not limited to this. Not only the passport numbers, but also country information read from the passport information may be added and output. Further, contents of the tax exemption amounts and the transfer slip for the tax exemption can be processed into information sorted for each county (information on how many people have applied for the tax exemption, countries they came from, and/or amounts of the tax exemption that they applied for) based on the country information, and the processed information can be output. In this way, the information on the tax exemption processing cases for the day can be utilized in a sales strategy such as a sales plan from tomorrow and revision of sales materials in the store.

In step S117, the data uploading unit 314 uploads and transmits, to the management server 6 at a predetermined time (such as at midnight), data and/or information stored in the processed data storage unit 331 such that the processed data storage unit 331 of the MFP 3 and the tablet 4 is not filled up or to back up the data and/or the information. Then, the data backup unit control 63 of the management server 6 stores the data and/or the information uploaded from the MFP 3 or the tablet 4 in step S118.

Review

As described above, according to the embodiment, it can be effectively determined whether one or more obtained documents satisfy eligibility conditions. In this way, an operating rate of apparatuses in the store can be improved and smooth tax-exempt sale can be performed without affecting a sales task of commodities, performed conventionally, as far as possible.

As above, the present disclosure is described according to the embodiment of the present disclosure. Although the present disclosure is described with reference to the specific examples, it is apparent that various modifications and changes may be made to these specific examples without departing from the extensive points and the scope of the present disclosure as defined in the claims. That is, the present disclosure should not be limited by the details of the specific examples and the attached drawings.

Although the embodiment of the present disclosure is used in a scene of the tax exemption application in the above description, this is not intended to limit the applicable scope of the present disclosure to the tax exemption application processes.

The embodiment of the present disclosure may be applied not only to the tax exemption application but also to various use scenes. For example, as a preferable use scene, as can be seen from the tax exemption application processes, the embodiment of the present disclosure may be applied to a scene in which an owner who has acquired ownership of goods makes an application based on a cost required for the acquisition.

In the following, a summary of technologies which the embodiment of the present disclosure includes will be described based on the above descriptions.

A system structured with one or more apparatuses realizing the embodiment may include an image obtaining unit that reads a display medium, in which a predetermined document (corresponding to the passport in the above described embodiment) is displayed (written), using a reading unit such as a scanner and a photographing (imaging) unit. Then, the image obtaining unit obtains an image (in the following, referred to as the "display image") of contents displayed in the display medium. It should be noted that the display medium is owned by the user, and is not limited to a paper medium such as the current passport. The display medium may be an electronic paper or a display of a terminal. Further, individual information on the user such as the nationality and the passport number is described in the displayed contents.

Further, the system structured with one or more apparatuses realizing the embodiment may include a described content recognition unit that extracts, from the obtained display image, an image (in the following, referred to as the "extraction image") of a predetermined extraction area (corresponding to the position information and the like in the above described embodiment). Then, the described content recognition unit recognizes information (corresponding to characters and/or numerals such as the passport number and the identification information of the nationality in the above described embodiment, and referred to as the "description information" hereinafter) on described contents described in the extraction image.

Further, the system structured with one or more apparatuses realizing the embodiment may include a collation determination unit that determines whether the obtained description information matches a predetermined collation content (corresponding to a value of the identification information of the country in the above described embodiment). Here, the collation content and the extraction area, to be collated, for obtaining the description information are associated in advance, and the collation content is collated with the description information recognized in the extraction image extracted from the associated extracted area.

Further, in the system structured with one or more apparatuses realizing the embodiment, the extraction area of the description information desired to be obtained from the display image is set in association with the collation content, and the system obtains the extraction image extracted from the display image based on the extraction area associated with the collation content determined to be matched by the collation determination unit. It should be noted that in a case in which a plurality of description information items desired to be obtained are present in different areas, a plurality of extraction areas can be set in association with one collation content. Moreover, by setting identification information items (corresponding to the item names in the above described embodiment) for identifying the description information items in association with the extraction areas, the identification information items can be associated with the description information items obtained from the respective extraction areas. Here, the description information items desired to be obtained are individual information items (corresponding to the nationality, the passport number, and the like in the above described embodiment) on the user.

Further, the system structured with one or more apparatuses realizing the embodiment may include a display language specification unit that specifies, based on language designation information that designates a language, the language to be used to display information on a display screen. The language designation information is set in advance in association with the collation content, and is associated with the collation content determined to be matched. It should be noted that although it is not required to display all contents in the display screen in the specified language, description contents described in the specified language are displayed for at least a portion of the contents. Especially, because the language is specified from the document that the user owns, the contents described in the specified language are displayed when the display screen to be operated by the user, who owns the document, is displayed.

Further, the system structured with one or more apparatuses realizing the embodiment may include an input information obtaining unit that obtains information input (entered) by the user, who owns the document, operating the display screen in which information is described in the specified language.

Further, the system structured with one or more apparatuses realizing the embodiment may include a history information obtaining unit that obtains history information form a recording medium (corresponding to the receipt or the POS register 2 in the above described embodiment) in which history information is recorded. The history information relates to a history of actions (corresponding to purchase actions by the purchaser in the above described embodiment) of the user, and includes values (corresponding to the unit prices, the quantities, and the total price in the above described embodiment) for one or more respective items (corresponding to the commodities in the above described embodiment) in which names are described. Further, the history information includes information that specifies a location (corresponding to the store in the above described embodiment) where the user acts, and information on a date and time when the user acts.

Further, the system structured with one or more apparatuses realizing the embodiment may include a classification specification unit that specifies, for each of one or more items included in the obtained history information, a classification into which a name of an item is classified among a plurality of classifications (corresponding to the general commodity, the consumable commodity, and a commodity except for the commodity and the consumable commodity in the above described embodiment). It should be noted that as an example of the method for specifying the classification, a method may be used to register in advance classifications in accordance with names of all items having possibility to be recorded in the history, and based on this, specifying classifications in accordance with the respective items recorded in the history information.

Further, the system structured with one or more apparatuses realizing the embodiment may include a calculation unit that calculates a total value (corresponding to the total amount (price) in the above described embodiment) based on numerical values for one or more items specified as the same classification. Further, the calculation unit can receive numerical values to the respective items or revision to the calculated total value, and can update the total value.

Further, the system structured with one or more apparatuses realizing the embodiment may include a numerical condition determination unit that determines whether the total value satisfies one or more predetermined numerical conditions (corresponding to one or more tax exemption conditions (10,001 Japanese yen or more, or 1,000,001 Japanese yen or more for a total amount of general commodities, between 5,001 and 500,000 Japanese yen for a total amount of consumable commodities) in the above described embodiment). Further, the one or more numerical conditions can be set in accordance with the classifications, and it can be determined whether a total value calculated for a classification satisfies a numerical condition set for the classification. Further, a plurality of numerical conditions can be set for one classification, and determination can be made for the respective conditions.

Further, the system structured with one or more apparatuses realizing the embodiment may include an output control unit that controls whether to execute printing (printout) based on the determination result for the numerical condition(s). Further, the system structured with one or more apparatuses realizing the embodiment may include a storage control unit controls whether to execute a process for storing the obtained display image based on the determination result. Further, the system structured with one or more apparatuses realizing the embodiment may include an item selection unit. In a case in which the printing cannot be executed based on the determination result, the item selection unit displays, an item selection screen for selecting, from one or more items relating to the calculation of the total value, one or more items (in the following, referred to as the "calculation exclusion items") to be excluded from objects of the calculation of the total value. In other words, the selected calculation exclusion items are not used to calculate the total value. After the selection, the numerical condition determination unit determines whether a total value, calculated by excluding the calculation exclusion item(s) from the one or more items relating to the calculation of the total value, satisfies the numerical condition(s). Based on this determination result, the output control unit can control whether to execute the printing (printout).

Further, the system structured with one or more apparatuses realizing the embodiment may include a print data creation unit. In a case in which the printing is executed based on the determination result, the print data creation unit creates print data based on prestored format data. It should be noted that format data is stored corresponding to each of a plurality of languages, and format data of a language of the language designation information associated with the collation content determined to be matched is used in creating the print data. This is because the user, who owns the document, fills in a sheet on which the print data is printed. Further, the print data creation unit creates the print data based on the obtained description information. Further, the print data creation unit creates the print data based on the obtained history information.

The present disclosure can be implemented in any convenient form, for example using dedicated hardware, or a mixture of dedicated hardware and software. The present disclosure may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Because the present disclosure can be implemented as software, each and every aspect of the present disclosure thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus."

Correspondence of Terms in Claims and Terms in the Embodiment

The area/character recognition unit 303 is an example of a "recognition unit". The area/character recognition unit 303, the data obtaining unit 305, or the data input/revision unit 306 is an example of an "information obtaining unit". The print processing unit 311 is an example of a "printing unit". The document creation unit 309 or the print processing unit 311 is an example of a "determination unit".

The present application is based on and claims the benefit of priority of Japanese Priority Application No. 2015-105203 filed on May 25, 2015 with the Japanese Patent Office and Japanese Priority Application No. 2015-220712 filed on Nov. 10, 2015 with the Japanese Patent Office, the entire contents of which are hereby incorporated by reference.

What is claimed is:

1. A system for printing a tax document for tax-exempt sale, the system comprising:
a memory; and
at least one processor that is coupled to the memory and that is configured to:
recognize, based on an obtained image, a described content of a passport or a qualification document that indicates a qualification for entering a country;
obtain price information on a selling price of a commodity;
print the tax document for tax-exempt sale for the commodity using the recognized described content;
determine, based on the obtained price information, whether to print an image of the passport or the qualification document in the obtained image with the tax document for tax-exempt sale; and
upon determining to print the image of the passport or the qualification document in the obtained image with the tax document for tax-exempt sale, cause a printer to print, on a sheet, the image of the passport or the qualification document with the document for tax-exempt.

2. The system according to claim 1,
wherein the at least one processor receives information on the commodity entered into the system.

3. The system according to claim 1,
wherein the at least one processor obtains an image of a receipt printed when the commodity is purchased, and recognizes a described content of the image of the receipt.

4. The system according to claim 1,
wherein the at least one processor is configured to recognize the described content of the passport or the qualification document from the obtained image based on information in which a description position and a description item of an existing passport or an existing qualification document are associated.

5. The system according to claim 3,
wherein the at least one processor determines one or more commodities that are subject to tax exemption using the described content of the image.

6. The system according to claim 5,
wherein the at least one processor is configured to determine, based on information that defines a condition for the tax exemption, the one or more commodities that are subject to the tax exemption using the described content of the image of the receipt.

7. The system according to claim 1,
wherein the at least one processor is configured to request a predetermined printing apparatus to print the tax document for tax-exempt sale created based on format information that defines a format of the tax document for tax-exempt sale.

8. The system according to claim 1,
wherein the at least one processor is configured to print the tax document for tax-exempt sale on one predetermined sheet, and
wherein in a case in which advertisement information having a predetermined size can be added on the one predetermined sheet, the at least one processor adds the advertisement information on the one predetermined sheet.

9. The system according to claim 1,
wherein the at least one processor is configured to create, based on at least one of a nationality of a purchaser, the commodity, the price information, and the described content of the passport or the qualification document, advertisement information to be recommended to the purchaser and to print the advertisement information with the tax document for tax-exempt sale.

10. The system according to claim 1,
wherein the at least one processor stores, in the memory, the image of the passport or the qualification document and information on the tax document for tax-exempt sale in a case in which there is a duty to store the image of the passport or the qualification document.

11. The system according to claim 1,
wherein the commodity is a consumable commodity or a general commodity, and
wherein the at least one processor provides, when the consumable commodity or the general commodity is adjusted in a register, information representing that the consumable commodity or the general commodity is subject to tax exemption in a case in which the consumable commodity or the general commodity exceeds a predetermined price.

12. The system according to claim 1, wherein the at least one processor obtains information on a receipt printed from a register when the commodity is purchased.

13. The system according to claim 1,
wherein the at least one processor is configured to print, based on information on a country included in the described content of the passport or the qualification document, the tax document for tax-exempt sale in which a predetermined item is described in a native language of the country.

14. The system according to claim 1,
wherein in a case in which a camera of an image obtaining apparatus is used to capture a code in which the described content of the passport or the qualification document is embedded, the at least one processor displays, on a monitor of the image obtaining apparatus, an image photographed by the camera and a reading frame for reading the code, the reading frame being positioned at a position where entirety of a page including the code fits in the monitor when entirety of the code fits in the reading frame.

15. The system according to claim 14,
wherein the at least one processor starts obtaining the image photographed by the camera in a case in which the code is recognized when the code fits in the reading frame.

16. The system according to claim 14,
wherein the at least one processor starts obtaining the image photographed by the camera in a case in which the code is recognized and the image of the passport or the qualification document fits in a visual field of the camera with predetermined image quality when the code fits in the reading frame.

17. The system according to claim 1,
wherein in a case in which a camera of an image obtaining apparatus is used to capture a code in which the described content of the passport or the qualification document is embedded, the at least one processor displays, on a monitor of the image obtaining apparatus, an image projected with the camera and a reading frame for reading the code,
wherein in a case in which it is required to obtain the image of the passport or the qualification document, the reading frame is positioned at a position where entirety of a page including the code fits in the monitor when entirety of the code fits in the reading frame, and
wherein in a case in which it is not required to obtain the image of the passport or the qualification document, the reading frame is positioned at an arbitrary position.

18. The system according to claim 1,
wherein the at least one processor is configured to select, in accordance with a layout of the tax document for tax-exempt sale to be printed, one feeding cassette from a plurality of feeding cassettes in which a plurality of kinds of sheets are set, and to print the tax document for tax-exempt sale on a sheet fed from the selected feeding cassette.

19. An apparatus for printing a tax document for tax-exempt sale, the apparatus comprising:
a memory; and
at least one processor that is coupled to the memory and that is configured to:
recognize, based on an obtained image, a described content of a passport or a qualification document that indicates a qualification for entering a country;
obtain price information on a selling price of a commodity;
print the tax document for tax-exempt sale for the commodity using the recognized described content;
determine, based on the obtained price information, whether to print an image of the passport or the qualification document in the obtained image with the tax document for tax-exempt sale;
upon determining to print the image of the passport or the qualification document in the obtained image with the tax document for tax-exempt sale, cause a printer to print, on a sheet, the image of the passport or the qualification document with the document for tax-exempt sale; and
upon determining not to print the image of the passport or the qualification document in the obtained image with the tax document for tax-exempt sale, discard data of the obtained image after recognizing the described content of the passport or the qualification document.

20. A method for printing a tax document for tax-exempt sale, the method comprising:
recognizing, based on an obtained image, a described content of a passport or a qualification document that represents a qualification for entering a country;
obtaining price information on a selling price of a commodity;
printing the tax document for tax-exempt sale for the commodity using the recognized described content recognized in the recognition step;
determining, based on the obtained price information, whether to print an image of the passport or the qualification document in the obtained image with the tax document for tax-exempt sale; and
upon determining to print the image of the passport or the qualification document in the obtained image with the tax document for tax-exempt sale, causing a printer to print, on a sheet, the image of the passport or the qualification document with the document for tax-exempt sale.

* * * * *